United States Patent

(12) United States Patent
Yoo et al.

(10) Patent No.: US 10,997,752 B1
(45) Date of Patent: May 4, 2021

(54) UTILIZING A COLORIZATION NEURAL NETWORK TO GENERATE COLORIZED IMAGES BASED ON INTERACTIVE COLOR EDGES

(71) Applicant: Adobe Inc., San Jose, CA (US)

(72) Inventors: Seungjoo Yoo, Seoul (KR); Richard Zhang, San Francisco, CA (US); Matthew Fisher, San Francisco, CA (US); Jingwan Lu, Santa Clara, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/813,050

(22) Filed: Mar. 9, 2020

(51) Int. Cl.
*G06T 7/13* (2017.01)
*G06T 11/00* (2006.01)
*G06T 7/90* (2017.01)

(52) U.S. Cl.
CPC ............. *G06T 11/001* (2013.01); *G06T 7/13* (2017.01); *G06T 2200/24* (2013.01); *G06T 2207/20084* (2013.01); *G06T 2207/20096* (2013.01)

(58) Field of Classification Search
CPC ..................... G06T 11/001; G06T 7/13; G06T 2207/20081; G06T 2207/20084; G09G 5/02; G09G 5/06; G09G 2320/0666; G09G 2320/0626
See application file for complete search history.

(56) References Cited

U.S. PATENT DOCUMENTS

| | | | |
|---|---|---|---|
| 5,710,877 A * | 1/1998 | Marimont | G06T 11/00 345/427 |
| 2010/0183222 A1* | 7/2010 | Fattal | G06T 5/10 382/166 |
| 2017/0116765 A1* | 4/2017 | Chamaret | G06T 7/155 |
| 2019/0392564 A1* | 12/2019 | Sun | G06T 5/009 |
| 2020/0134381 A1* | 4/2020 | Chandra Sekar Rao | G06K 9/46 |

OTHER PUBLICATIONS

Sangkloy, Lu, Fang, Yu, Hays. Scribbler: Controlling Deep Image Synthesis With Sketch and Color. CVPR 2017.
Paul Bao, Lei Zhang, and Xiaolin Wu. Canny edge detection enhancement by scale multiplication. IEEE transactions on pattern analysis and machine intelligence, 27(9):1485-1490, 2005.
(Continued)

*Primary Examiner* — Todd Buttram
(74) *Attorney, Agent, or Firm* — Keller Jolley Preece

(57) ABSTRACT

Methods, systems, and non-transitory computer readable storage media are disclosed for utilizing an edge prediction neural network and edge-guided colorization neural network to transform grayscale digital images into colorized digital images. In one or more embodiments, the disclosed systems apply a color edge prediction neural network to a grayscale image to generate a color edge map indicating predicted chrominance edges. The disclosed systems can present the color edge map to a user via a colorization graphical user interface and receive user color points and color edge modifications. The disclosed systems can apply a second neural network, an edge-guided colorization neural network, to the color edge map or a modified edge map, user color points, and the grayscale image to generate an edge-constrained colorized digital image.

20 Claims, 13 Drawing Sheets

(56) References Cited

OTHER PUBLICATIONS

Satoshi Iizuka, Edgar Simo-Serra, and Hiroshi Ishikawa. Let there be color!: joint end-to-end learning of global and local image priors for automatic image colorization with simultaneous classification. ACM Transactions on Graphics (TOG), 35(4):110, 2016.

Phillip Isola, Jun-Yan Zhu, Tinghui Zhou, and Alexei A Efros. Image-to-image translation with conditional adversarial networks. In Proceedings of the IEEE conference on computer vision and pattern recognition, pp. 1125-1134, 2017.

Gustav Larsson, Michael Maire, and Gregory Shakhnarovich. Learning representations for automatic colorization. In European Conference on Computer Vision, pp. 577-593. Springer, 2016.

D. Martin, C. Fowlkes, D. Tal, and J. Malik. A database of human segmented natural images and its application to evaluating segmentation algorithms and measuring ecological statistics. In Proc. 8th Int'l Conf. Computer Vision, vol. 2, pp. 416-423, Jul. 2001.

Olaf Ronneberger, Philipp Fischer, and Thomas Brox. U-net: Convolutional networks for biomedical image segmentation. In International Conference on Medical image computing and computer-assisted intervention, pp. 234-241. Springer, 2015.

Saining Xie and Zhuowen Tu. Holistically-nested edge detection. In Proceedings of the IEEE international conference on computer vision, pp. 1395-1403, 2015.

Fisher Yu, Vladlen Koltun, and Thomas Funkhouser. Dilated residual networks. In Proceedings of the IEEE conference on computer vision and pattern recognition, pp. 472-480, 2017.

Richard Zhang, Phillip Isola, and Alexei A Efros. Colorful image colorization. In European Conference on Computer Vision (ECCV), pp. 649-666. Springer, 2016.

Richard Zhang, Jun-Yan Zhu, Phillip Isola, Xinyang Geng, Angela S Lin, Tianhe Yu, and Alexei A Efros. Real-time user-guided image colorization with learned deep priors. 2017.

Jun-Yan Zhu, Richard Zhang, Deepak Pathak, Trevor Darrell, Alexei A Efros, Oliver Wang, and Eli Shechtman. Toward multimodal image-to-image translation. In Advances in Neural Information Processing Systems, pp. 465-476, 2017.

\* cited by examiner

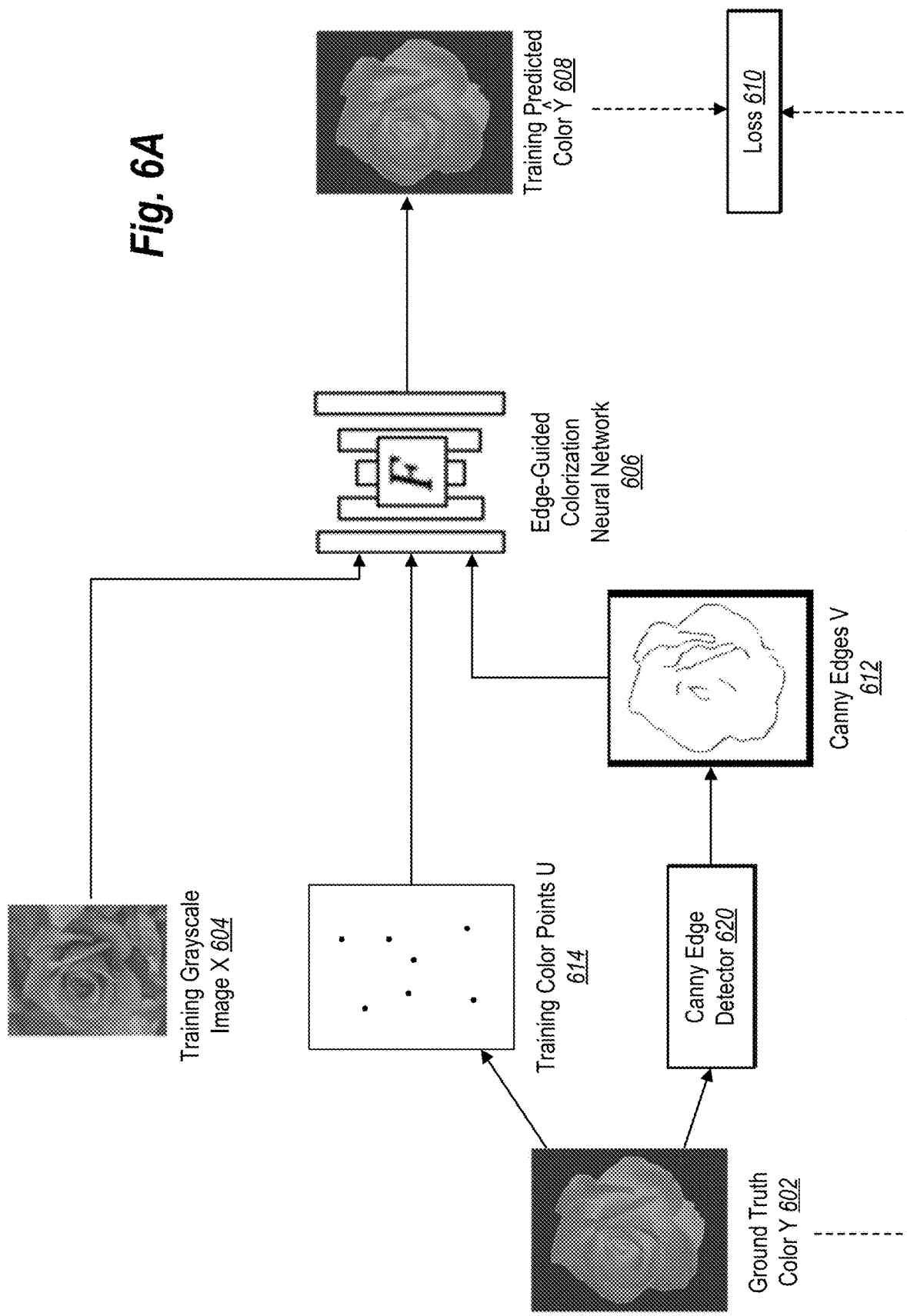

UTILIZING A COLORIZATION NEURAL NETWORK TO GENERATE COLORIZED IMAGES BASED ON INTERACTIVE COLOR EDGES

BACKGROUND

Recent years have seen significant improvement in hardware and software platforms for editing and generating digital images. For example, developers have created technologies to modify or improve digital images including photographs and illustrations. To illustrate, conventional image colorizing systems can automatically add color to complex black and white or grayscale images based on user selection of particular fill colors. For example, client devices can select colors corresponding to particular areas of a grayscale image, and image colorizing systems can generate a digital image reflecting the selected colors.

Although conventional image colorizing systems can add color to digital images, they have a number of technical shortcomings. Specifically, conventional image editing systems are often inaccurate, inflexible, and inefficient when applying color to digital images. For instance, conventional image colorizing systems often add color that results in implausible, unrealistic digital images. More specifically, conventional systems are often unable to precisely determine the desired color regions for particular areas of images and inaccurately generate implausible resulting digital images. Indeed, images colorized by conventional image colorizing systems often suffer from color bleeding issues in which colors leak between segments of uncertainty.

Additionally, conventional image colorizing systems are often inflexible. In particular, conventional image colorizing systems rigidly generate colorized digital image that are difficult to modify or adjust. For example, after generating a colorized digital image, conventional image colorizing systems are often rigid in that they cannot flexibly adjust the colorized digital image to reflect different color regions (without significant user inputs). More specifically, conventional systems often comprise algorithms that rigidly map a single black and white image into a single set of fill boundaries for a color image. Thus, conventional image colorizing systems are often inflexible and fail to provide fluid options for modifying colorized digital images and colored regions.

Furthermore, conventional image colorizing systems are often inefficient. In particular, conventional systems must often devote additional computing resources to correcting color bleeding or other inaccuracies. For example, conventional systems often require voluminous user interaction and corresponding memory and processing power to modify digital images within incorrectly colored areas. Thus, conventional image colorizing systems are often required to re-analyze pixels or regions and adjust the desired colorization. Even then, by adding color in one segment, conventional systems may often mis-color other segments. Alternatively, many conventional systems devote additional computing and time resources by requiring users to explicitly segment desired regions and perform floodfilling.

These and other disadvantages exist with respect to conventional image colorizing systems.

SUMMARY

One or more embodiments provide benefits and/or solve one or more of the foregoing or other problems in the art with systems, methods, and non-transitory computer readable storage media that utilize a colorization neural network to efficiently, accurately, and flexibly perform user-guided grayscale image colorization. In particular, the disclosed systems can incorporate color edges as an input to help guide a colorization neural network in accurately propagating color inputs. To illustrate, the disclosed system can utilize a color edge prediction neural network to generate and present user-selectable color edges. The disclosed system can flexibly add or remove color edges and then analyze the color edges and selected color points utilizing a colorization neural network to generate a colorized image. By using a color edge prediction neural network to generate interactive color edges that can be utilized with a colorization neural network, the disclosed systems can efficiently and flexibly generate accurate colorized digital images.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings which are summarized below.

FIGS. 6A-6B illustrate the edge-guided colorization system training and applying an edge-guided colorization neural network in accordance with one or more embodiments of the present disclosure.

DETAILED DESCRIPTION

Figure 1:
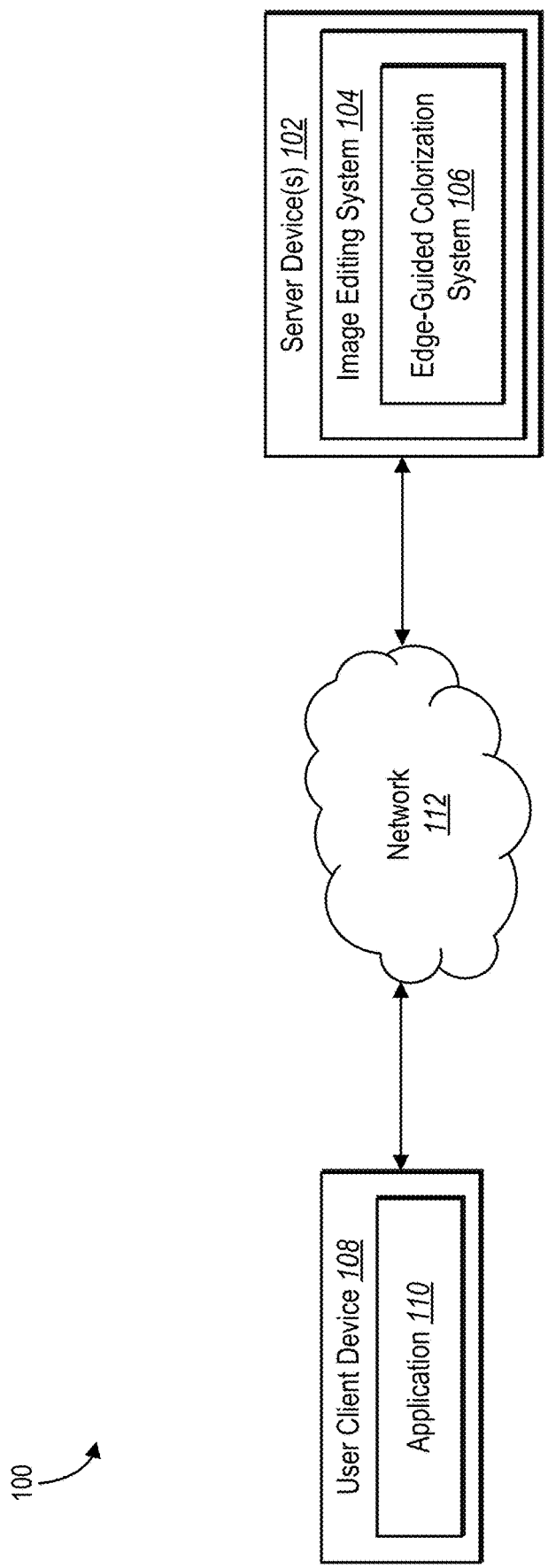
FIG. 1 illustrates an environment in which an edge-guided colorization system can operate in accordance with one or more embodiments of the present disclosure.

One or more embodiments of the present disclosure include an edge-guided colorization system that utilizes a deep colorization neural network to efficiently and accurately generate colorized images using user-guided color edges. For example, the edge-guided colorization system can utilize a two-stage approach to generated colorized digital images. In a first stage, the edge-guided colorization system can utilize an edge-prediction neural network to analyze a grayscale image and generate an interactive edge map that includes a set of color edges. In particular, the edge-guided colorization system can present this interactive edge map via a graphical user interface that includes a variety of dynamic elements to modify color edges (such as a global slider element that modifies the number of color edges or a suggestion element that recommends additional color edges). In a second stage, the edge-guided colorization system can analyze an edge map utilizing an edge-guided colorization neural network to generate a colorized digital image. In particular, the edge-guided colorization system can utilize selected color edges together with a greyscale image and selected color points as channel inputs to the edge-guided colorization neural network to generate a colorized digital image. By predicting and presenting interactive color edges utilizing a color edge prediction neural network and then utilizing the interactive color edges in conjunction with an edge-guided colorization neural network, the edge-guided colorization system can flexibly and efficiently generate accurate colorized digital images.

To illustrate, in one or more embodiments, the edge-guided colorization system utilizes a color edge prediction neural network to generate a color edge map comprising color edges for a grayscale digital image. The edge-guided colorization system can provide, for display to a client device, a colorization graphical user interface that includes the color edge map, a color point input element, and the grayscale digital image. The edge-guided colorization system can generate a colorized image using an edge-guided colorization neural network based on the grayscale digital image, the color edge map, and user interaction with the color point input element. The edge-guided colorization system can then provide the colorized image for display to the user via the colorization graphical user interface.

As mentioned, the edge-guided colorization system can train and apply a color edge prediction neural network to generate a color edge map. More specifically, the edge-guided colorization system can train a color edge prediction neural network based on comparing predicted color edges and ground truth color edges. In particular, the edge-guided colorization system can utilize a Canny edge detection algorithm to generate ground truth edges from a chrominance image. The edge-guided colorization system can then apply the color edge prediction neural network to a corresponding grayscale image to predict color edges, and then train the edge-guided colorization system by comparing the predicted color edges with the ground truth edges.

Once trained, the edge-guided colorization system can utilize the color edge prediction neural network to predict color edges for a grayscale digital image. More specifically, the edge-guided colorization system can utilize the color edge prediction neural network to generate initial edges and determine confidence scores for each of the initial edges. The edge-guided colorization system can identify initial edges with confidence scores that satisfy a color edge threshold and utilizes the identified edges to generate a color edge map.

As discussed, the edge-guided colorization system can provide, for display at a client device, a colorization graphical user interface that includes the color edge map, a color point input element, and the grayscale digital image. The edge-guided colorization system can utilize the colorization graphical user interface to collect inputs for the edge-guided colorization neural network. In particular, the edge-guided colorization system can receive, via the color point input element, the user color points that identify locations of the digital image that correspond to particular colors.

As mentioned above, in some embodiments, the edge-guided colorization system also provides dynamic user interface elements to collect user edge guidance and modify color edges. In some embodiments, the edge-guided colorization system can provide a color edge threshold element, an edge suggestion element, and/or a user-drawn edge element. For example, based on interaction with the color edge threshold element (e.g., a slider or some other type of element), the edge-guided colorization system can modify the color edge threshold utilized by the color edge prediction neural network in generating color edges. Similarly, based on user interaction with the edge suggestion element, the edge-guided colorization system can apply a Canny edge detection algorithm to identify luminance edges of the grayscale image to suggest to the client device. Moreover, based on user interaction with the user-drawn edge element, the edge-guided colorization system can identify edges drawn by the user via a client device.

In addition, the edge-guided colorization system can also train and utilize an edge-guided colorization neural network to generate a colorized image. The edge-guided colorization system can train the edge-guided colorization neural network using training data. More specifically, the edge-guided colorization system can use training grayscale images, training color points, and training color edges extracted from ground truth color images as training inputs for the edge-guided colorization neural network to generate predicted colorized images. The edge-guided colorization system can train the edge-guided colorization neural network by comparing the predicted colorized images with ground truth colorized images and adjusts network parameters to minimize loss.

Once trained, the edge-guided colorization system can apply the edge-guided colorization neural network to a target grayscale digital image to generate colorized images. For example, in some embodiments, the edge-guided colorization system utilizes a target grayscale image, user selected color points, and a color edge map as input channels for the edge-guided colorization neural network to generate colorized digital image. In some embodiments, the edge-guided colorization system directly concatenates the edge map into feature maps analyzed at various layers of the edge-guided colorization neural network to further incorporate edge guidance in predicting color for the grayscale image. Thus, the edge-guided colorization neural network can generate a colorized image, and the edge-guided colorization system can present the colorized image to the user via the colorization graphical user interface.

The edge-guided colorization system provides several technical benefits relative to conventional systems. For example, the edge-guided colorization system can improve accuracy relative to conventional systems. In particular, by utilizing a color edge prediction neural network to generate interactive color edges that can be used in conjunction with an edge-guided colorization neural network, the edge-guided colorization system can reduce color bleeding. Indeed, by generating a color edge map utilizing a color edge prediction neural network, the edge-guided colorization system more accurately defines chrominance edges for a colorized image. Furthermore, the edge-guided colorization system can improve accuracy of predicted color edge maps by receiving user edge guidance with regard to the predicted color edges. For example, the edge-guided colorization system can improve accuracy by generating a modified color edge map based on user interaction with interactive color edges.

The edge-guided colorization system can also improve flexibility relative to conventional systems. Indeed, by providing a variety of edge modification interface elements, the edge-guided colorization system can generate several different colorized images from a single grayscale digital image. For example, the edge-guided colorization system can generate colorized images having different numbers of chrominance edges by modifying edge thresholds to include more or fewer color edges within a color edge map. Similarly, by suggested additional color edges and allowing user modification of color edges, the edge-guided colorization system can flexibly generated colorized images and provide a variety of options to fluidly modify edges or color regions.

Additionally, the edge-guided colorization system can improve efficiency relative to conventional systems. More specifically, the edge-guided image colorization system can reduce the number of interactions and corresponding resources required to generate accurate colorized images. For example, through a handful of interactions with edge modification interface elements, the edge-guided colorization system can modify color edges and efficiently correct errors in the resulting digital image. Indeed, the edge-guided colorization system can generate edge maps, suggest additional edges, and quickly add or remove edges to generate colorized digital images with minimal user input.

As illustrated by the foregoing discussion, the present disclosure utilizes a variety of terms to describe features and advantages of the edge-guided colorization system. Additional detail is now provided regarding the meaning of such terms. For example, as used herein, the term "grayscale digital image" refers to a digital image that includes pixels reflecting shades of gray. In particular, a grayscale digital image can include an image in which each pixel has intermediate tone gradation values between white and black. More specifically, each pixel in a grayscale digital image can represent a lightness or intensity value (e.g., not representations of color or hue). To illustrate, grayscale images can comprise pixels with values in the L or lightness channel in a CIE Lab color space.

As used herein, the term "color edge map" refers to a collection of color edges. In particular, a color edge map can include an array, image, or other digital representation indicating locations of color edges within a digital image. For example, a color edge map can include a binary image with values indicating the locations of color edges or chrominance edge boundaries of a corresponding target digital image. Furthermore, a color edge map can include detected edges within a chrominance map. Chrominance maps are, in contrast with grayscale digital images, images whose pixels reflect color values. For example, chrominance maps can include the a and/or b channels in a CIE Lab color space.

As used herein, the term "neural network" refers to a machine learning model that can be trained based on training input to approximate unknown functions. In particular, the term neural network can include a model of interconnected digital neurons that communicate and learn to approximate complex functions and generate output based on a plurality of inputs provided to the model. For instance, the term neural network includes one or more machine learning algorithms, including convolutional neural networks, recurrent neural networks (e.g., LSTMs), generative neural networks, adversarial neural networks, support vector machines, feed forward neural networks, autoencoders, or variational autoencoders. As described in greater detail below, the edge-guided colorization system can utilize a color edge prediction neural network (i.e., a neural network for predicting color edges) and an edge-guided colorization neural network (i.e., a neural network for generating colorized digital images based on color edges).

As used herein, the term "color edges" refers to boundaries between areas of different colors. In particular, color edges refer to chrominance boundaries, or regions where chrominance values change within a digital image. Color edges denote differences in color values within a digital image. For example, the term "color edges" refers to lines that indicate borders between areas with different color values within a digital image.

As used herein, the term "color point input element" refers to a user interface element for receiving a color input. More particularly, the term "color point input element" refers to a graphical user interface element for user input of points of a digital image corresponding to particular colors. For example, a color point input element can comprise a color gamut that provides the entire range of colors available for a specific pixel of a digital image.

As used herein, the term "colorized image" refers to a digital image comprising pixels with color or hue values. In particular, the term "colorized image" refers to an image to which color has been added (e.g., RBG values). For example, the term "colorized image" can refer to an image with pixel values in a and/or b channels in a CIE Lab color space. More specifically, a colorized image includes pixels with lightness and color values.

Additional detail will now be provided regarding the edge-guided colorization system in relation to illustrative figures portraying example embodiments and implementations of the edge-guided colorization system. For example, FIG. 1 illustrates a schematic diagram of a system environment (or "environment") 100 in which an edge-guided colorization system 106 can operate in accordance with one or more embodiments. As illustrated, the environment 100 includes one or more server device(s) 102 connected to a user client device 108 via a network 112. While FIG. 1 shows an embodiment of the edge-guided colorization system 106, alternative embodiments and configurations are possible.

As shown in FIG. 1, the server device(s) 102 and the user client device 108 are connected via the network 112. Each of the components of the environment 100 can communicate via the network 112. The network 112 comprises any suitable network over which computing devices can communicate. Example networks are discussed in additional detail below in relation to FIG. 12.

As shown, the environment 100 includes the server device(s) 102. The server device(s) 102 may generate, store, receive, and transmit electronic data, such as digital video, digital images, digital audio, metadata, etc. The server device(s) 102 may receive data from the user client device 108. For example, the server device(s) 102 may gather and/or receive digital images including grayscale digital images, metadata, color points, color edges, color edge modifications, and other data. The server device(s) 102 can communicate with the user client device 108 via the network 112. For example, the server device(s) 102 can send digital images including colorized images, color edge maps, and other data to the user client device 108. In some embodiments, the server device(s) 102 comprises a distributed server where the server device(s) 102 include a number of server devices distributed across the network 112 and located in different physical locations. The server device(s) 102 can comprise a content server, an application server, a communication server, a web-hosting server, or a digital content management server.

As further shown in FIG. 1, the server device(s) 102 can include the image editing system 104. The image editing system 104 can create, modify, edit, share, distribute, and/or manage digital images. For example, the image editing system 104 stores a repository of grayscale digital images and colorized images received from the user client device 108 and from one or more other user client devices. Additionally, the image editing system 104 can access databases storing ground truth images including color digital images and corresponding grayscale images. The image editing system 104 can receive digital images, color points, color edge modifications, and other data from the user client device 108. Furthermore, the image editing system 104 can distribute colorized images to the user client device 108 (e.g., via an application or website accessed by the user client device 108).

As illustrated in FIG. 1, the edge-guided colorization system 106 can be implemented as part of the image editing system 104. The edge-guided colorization system 106 can receive grayscale digital images and generate colorized images. More specifically, the edge-guided colorization system 106 can implement a color edge prediction neural network to predict color edges and an edge-guided colorization neural network to color the image integrating edge constraints. The edge-guided colorization system 106 can communicate with the user client device 108. The edge-guided colorization system 106 can receive grayscale digital images, color points, and color edge modifications. Additionally, the edge-guided colorization system 106 can distribute colorized images (e.g., via the network 112).

As illustrated in FIG. 1, the environment 100 includes the user client device 108. The user client device 108 can generate, store, receive, and send digital data. In particular, the user client device 108 can send digital data including digital images to the server device(s) 102 via the network 112. The user client device 108 can present digital images to a user associated with the user client device 108.

The user client device 108 illustrated in FIG. 1 may comprise various types of client devices. For example, in some embodiments, the user client device 108 includes mobile devices such as laptops, tablets, mobile telephones, smartphones, etc. In other embodiments, the user client device 108 includes non-mobile devices, such as desktops or servers, or other types of client devices. Additional details with regard to the user client device 108 are discussed below with respect to FIG. 12.

As further illustrated in FIG. 1, the user client device 108 includes an application 110. The application 110 may be a web application or a native application on the user client device 108 (e.g., a mobile application, a desktop application, etc.). The application 110 can interface with the edge-guided colorization system 106 to provide digital content including digital images to the server device(s) 102. Indeed, the application 110 can receive data from the edge-guided colorization system 106 and can present, for display at the user client device 108, colorized images generated by the edge-guided colorization system 106.

Although FIG. 1 depicts the edge-guided colorization system 106 located on the server device(s) 102, in some embodiments, the edge-guided colorization system 106 may be implemented by (e.g., located entirely or in part) on one or more other components of the environment 100. For example, the edge-guided colorization system 106 may be implemented entirely (or in part) on the user client device 108. For example, the server device(s) 102 and/or the user client device 108 can have the digital images stored thereon.

Additionally, the user client device 108 can communicate directly with the edge-guided colorization system 106, bypassing the network 112. Moreover, the edge-guided colorization system 106 can access one or more databases (e.g., a digital document database) housed on the server device(s) 102 or elsewhere in the environment 100. Further, the edge-guided colorization system 106 can include one or more machine learning models (e.g., neural networks), and the edge-guided colorization system 106 can be implemented in a variety of different ways across the server device(s) 102, the network 112, and the user client device 108.

Figure 2B:
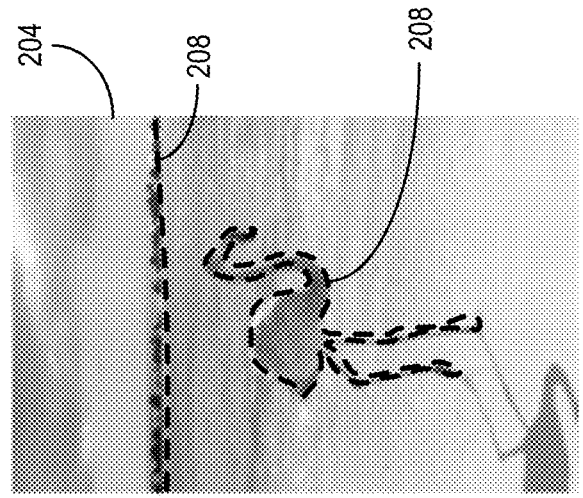
FIGS. 2A-2B illustrate example colorized images generated by conventional systems and by the edge-guided colorization system in accordance with one or more embodiments of the present disclosure.
Figure 2A:
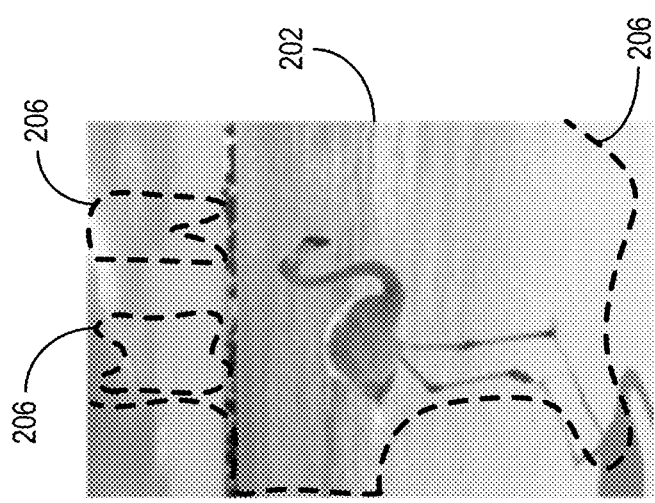

As mentioned previously, the edge-guided colorization system 106 can generate colorized images. For example, FIGS. 2A-2B illustrate the edge-guided colorization system 106 generating colorized images in accordance with one or more embodiments. In particular, FIGS. 2A-2B contrast one or more embodiments of the edge-guided colorization system 106 with conventional systems. For instance, FIG. 2A illustrates a conventional color image 202 comprising conventional color boundaries 206. FIG. 2B illustrates a colorized image 204 generated by the edge-guided colorization system 106 and comprising color edges 208.

FIG. 2A illustrates how conventional systems often generate color images subject to color bleeding. Color bleeding occurs when colors do not stay within accurate boundaries. Because FIG. 2A is not presented in color, this effect is illustrated using dashed lines showing color boundaries that delineate different colored regions. As illustrated, some conventional systems map a grayscale image to the conventional color image 202. However, the conventional systems often fail to predict the correct color for areas of uncertainty and fill the areas of uncertainty with the incorrect color. The conventional color image 202 includes the conventional color boundaries 206, which delineate pixel color values. For example, pixels within the region bounded by the conventional color boundaries 206 share the same color values. Additionally, regions on either side of the conventional color boundaries 206 contain pixels with different color values. As illustrated, the conventional color boundaries 206 of the conventional color image 202 are inaccurate and fail to follow the contours of the flamingo or other objects.

FIG. 2B illustrates a colorized image 204 generated by the edge-guided colorization system 106. As mentioned, the edge-guided colorization system 106 integrates edge guidance to more accurately color images. The edge-guided colorization system 106 can color images based on predicted and modified color edges. By integrating edge guidance, the edge-guided colorization system 106 relies on defined color edges to more accurately resolve areas of uncertainty. The colorized image 204 includes the color edges 208. The color edges 208 are more accurate than the conventional color boundaries 206 depicted in FIG. 2A. In particular, the pixels within the regions bounded by the color edges 208 have the same color values. For example, the flamingo is colored pink, the water is colored turquoise, and the sky is colored blue. As illustrated, the edge-guided colorization system 106 generates the colorized image 204, which is more accurate than the conventional color image 202 generated by conventional systems. The following figures and accompanying discussion provide additional detail for how the edge-guided colorization system 106 accurately generates colorized images and incorporates edge guidance.

Figure 3:
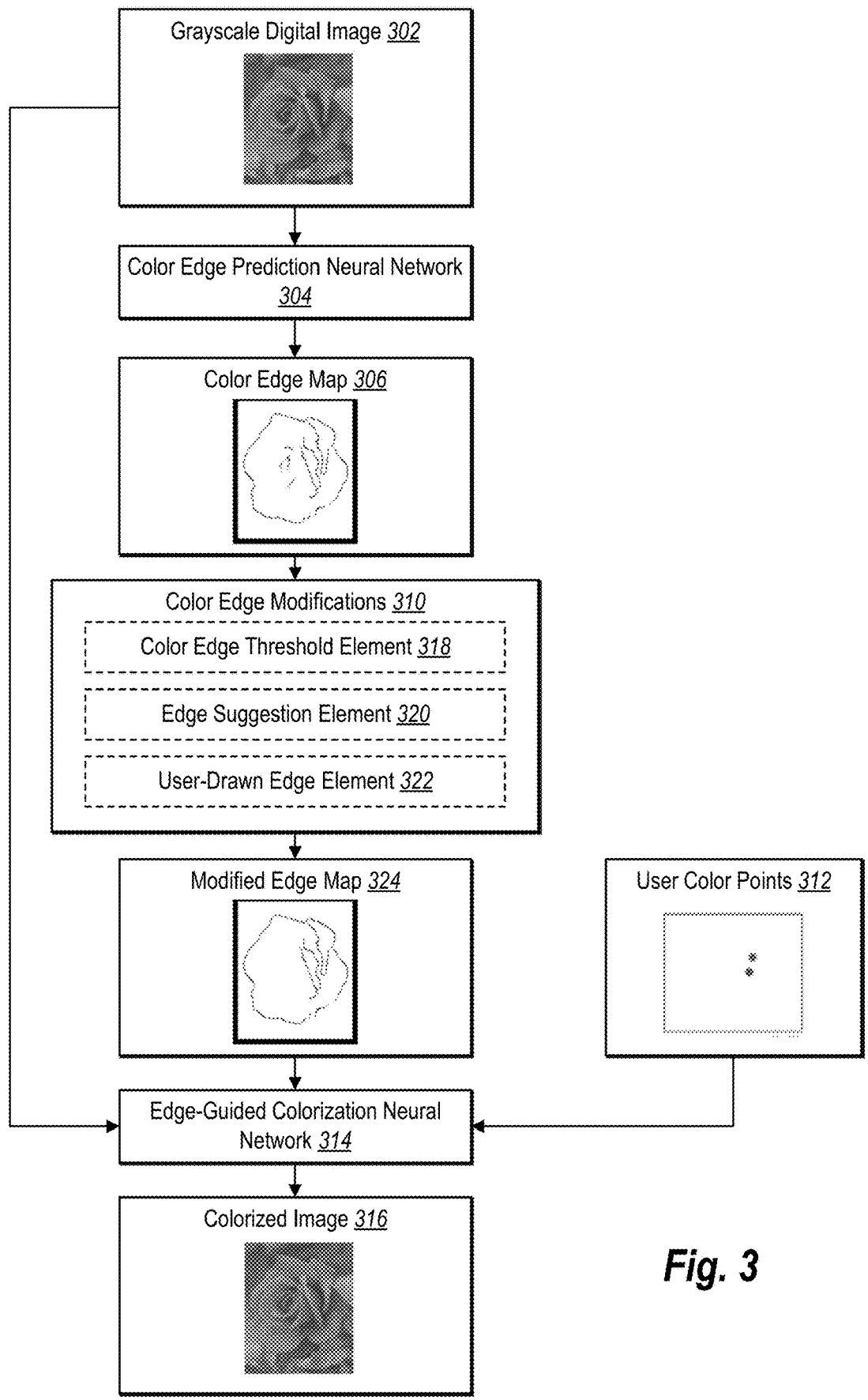
FIG. 3 illustrates an overview for generating a colorized image in accordance with one or more embodiments of the present disclosure.

For example, FIG. 3 illustrates the edge-guided colorization system 106 generating a colorized image utilizing a two-stage approach in accordance with one or more embodiments. In the first stage, the edge-guided colorization system 106 utilizes a color edge prediction neural network to generate a color edge map. In the second stage, the edge-guided colorization system 106 utilizes an edge-guided colorization neural network to generate a colorized image.

As illustrated, the edge-guided colorization system 106 receives a grayscale digital image 302. The edge-guided colorization system 106 analyzes the grayscale digital image 302 utilizing a color edge prediction neural network 304. For example, the color edge prediction neural network 304 can include a deep convolutional neural network with a plurality of layers. At various layers of the convolutional neural network, the color-edge prediction neural network 304 can generate feature maps (e.g., feature vectors) that allow the network to analyze different levels of abstraction. By analyzing these feature maps, the color edge prediction neural network 304 predicts a color edge map 306 based on the grayscale digital image 302. For example, in some embodiments, the color edge prediction neural network 304 utilizes the neural network architectures and approaches described by Richard Zhang, Phillip Isola, and Alexei A. Efros in Colorful Image Colorization, ECCV 2016 at 649-666 (2016) and described by Richard Zhang, Jun-Yan Zhu, Phillip Isola, Xinyang Geng, Angela S. Lin, Tianhe Yu, and Alexei A. Efros in *Real-Time User-Guided Image Colorization with Learned Deep Priors*, SIGGRAPH 2017, arXiv:1705: 02999, which are incorporated by reference in their entirety herein.

Figure 5:
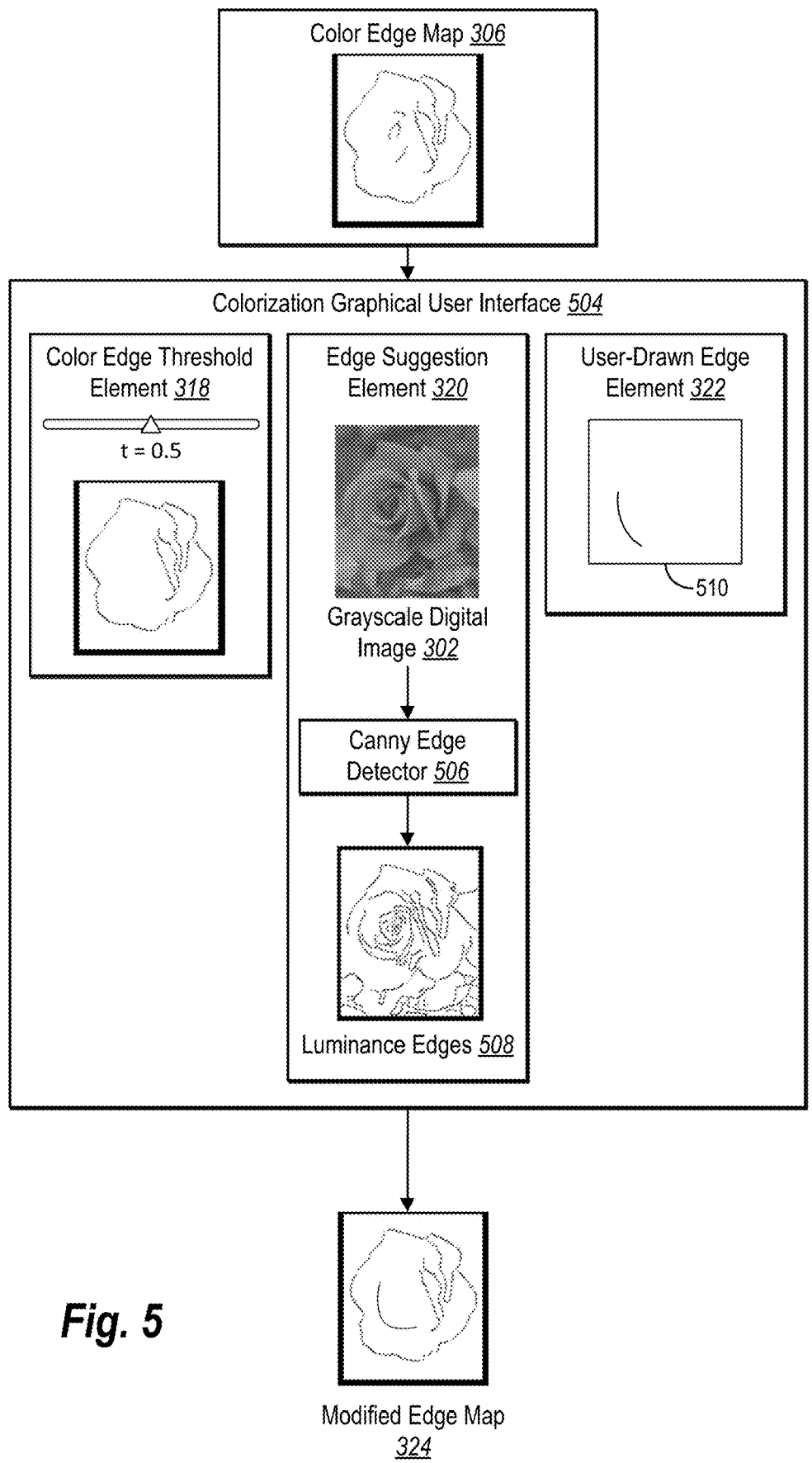
FIG. 5 illustrates an overview of the edge-guided colorization system generating a modified edge map from a color edge map in accordance with one or more embodiments of the present disclosure.

In relation to FIG. 3, the color edge prediction neural network 304 generates the color edge map 306 using a color edge threshold. The edge-guided colorization system 106 utilizes the color edge prediction neural network 304 to generate an initial color edge map comprising initial edges. As part of generating the initial color edge map, the color edge prediction neural network 304 determines a confidence score for each of the initial edges. The edge-guided colorization system 106 determines a color edge threshold. In one or more embodiments, the edge-guided colorization system 106 utilizes a predetermined color edge threshold. Furthermore, the edge-guided colorization system 106 can receive, from a user, the color edge threshold. Based on determining that the confidence score associated with an initial edge meets the color edge threshold, the edge-guided colorization system 106 includes the initial edge as a color edge in the color edge map 306. The edge-guided colorization system 106 excludes initial edges with confidence scores below the color edge threshold from the color edge map 306. FIGS. 5-6 and the accompanying discussion provide additional detail regarding the color edge threshold.

As shown in FIG. 3, the edge-guided colorization system 106 presents the color edge map 306 to a user. In at least one embodiment, the edge-guided colorization system 106 receives user input indicating one or more color edge modifications 310. For example, in relation to FIG. 3, the edge-guided colorization system 106 receives the color edge modifications 310 via a color edge threshold element 318, an edge suggestion element 320, and/or a user-drawn edge element 322. Based on the color edge modifications 310, the edge-guided colorization system 106 generates a modified edge map 324.

For example, the edge-guided colorization system 106 can detect user interaction with the color edge threshold element 318 and modify the color edge threshold. Based on the modified edge threshold, the edge-guided colorization system 106 includes, in the modified edge map 324, a modified set of color edges. For example, if the edge-guided colorization system 106 utilizes a modified edge threshold that is higher than the color edge threshold, the edge-guided colorization system 106 reduces the number of color edges in the color edge map 306 by removing the color edges whose confidence scores fall below the modified edge threshold. Thus, the modified set of color edges of the modified edge map 324 includes fewer color edges than the color edge map 306. Similarly, the edge-guided colorization system 106 increases the number of edges in the modified set of color edges when the edge-guided colorization system 106 implements a modified edge threshold that is lower than the color edge threshold.

As illustrated, the edge-guided colorization system 106 can also receive the color edge modifications 310 via the edge suggestion element 320. As mentioned, the edge-guided colorization system 106 can present suggested edges to a user. In at least one embodiment, the edge-guided colorization system 106 presents luminance edges as suggested edges via a colorization graphical user interface. For example, the edge-guided colorization system 106 can apply a Canny edge detection algorithm to the grayscale digital image 302 to generate predicted luminance edges. The edge-guided colorization system 106 can then present the predicted luminance edges as suggested edges. Based on user selection of one or more edges of the luminance edges, the edge-guided colorization system 106 includes the selected edges in the modified edge map 324. FIG. 5 and the accompanying discussion provide additional detail regarding the edge suggestion element 320.

Figure 7A:
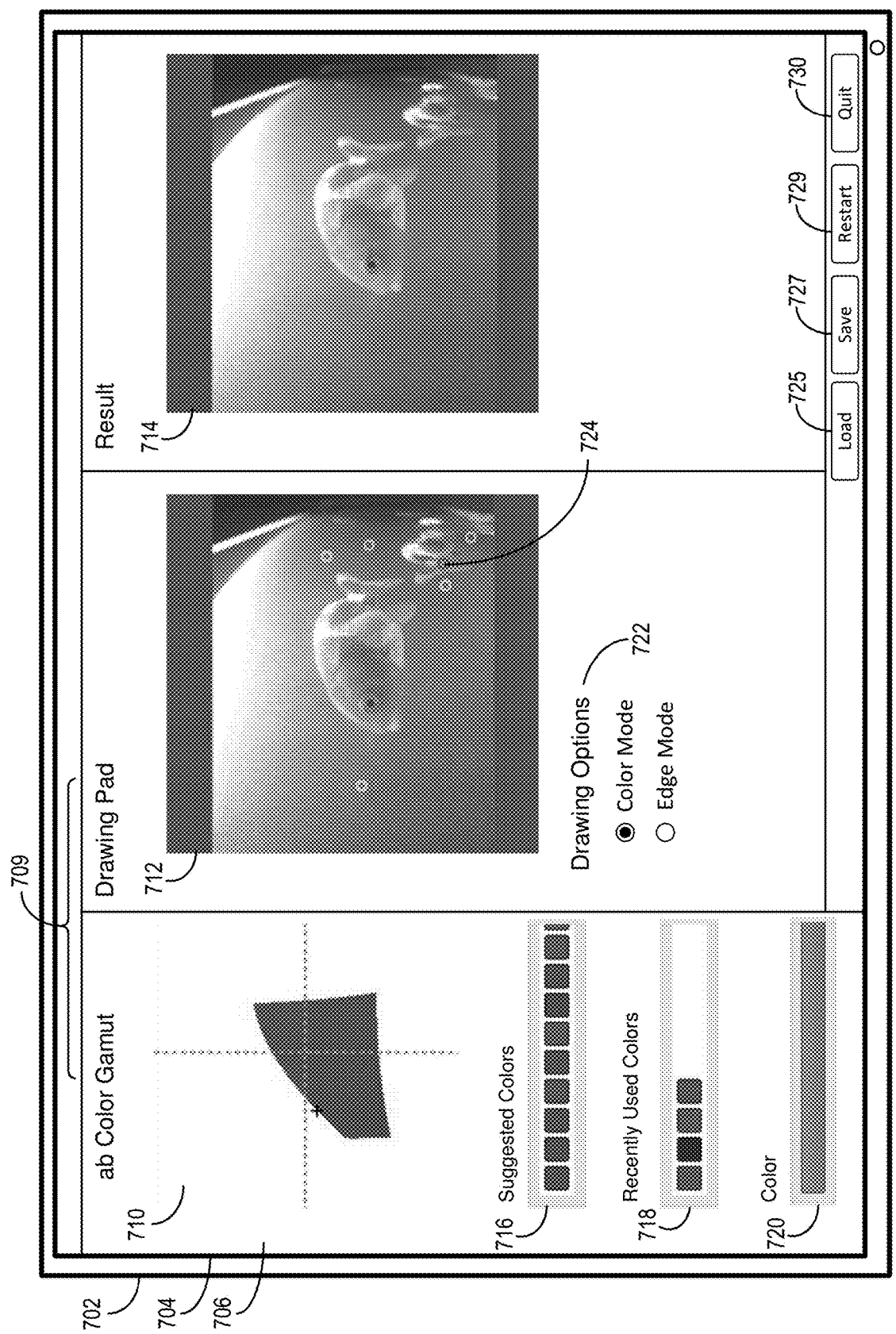
FIGS. 7A-7B illustrate example colorization graphical user interfaces in accordance with one or more embodiments of the present disclosure.
Figure 7B:
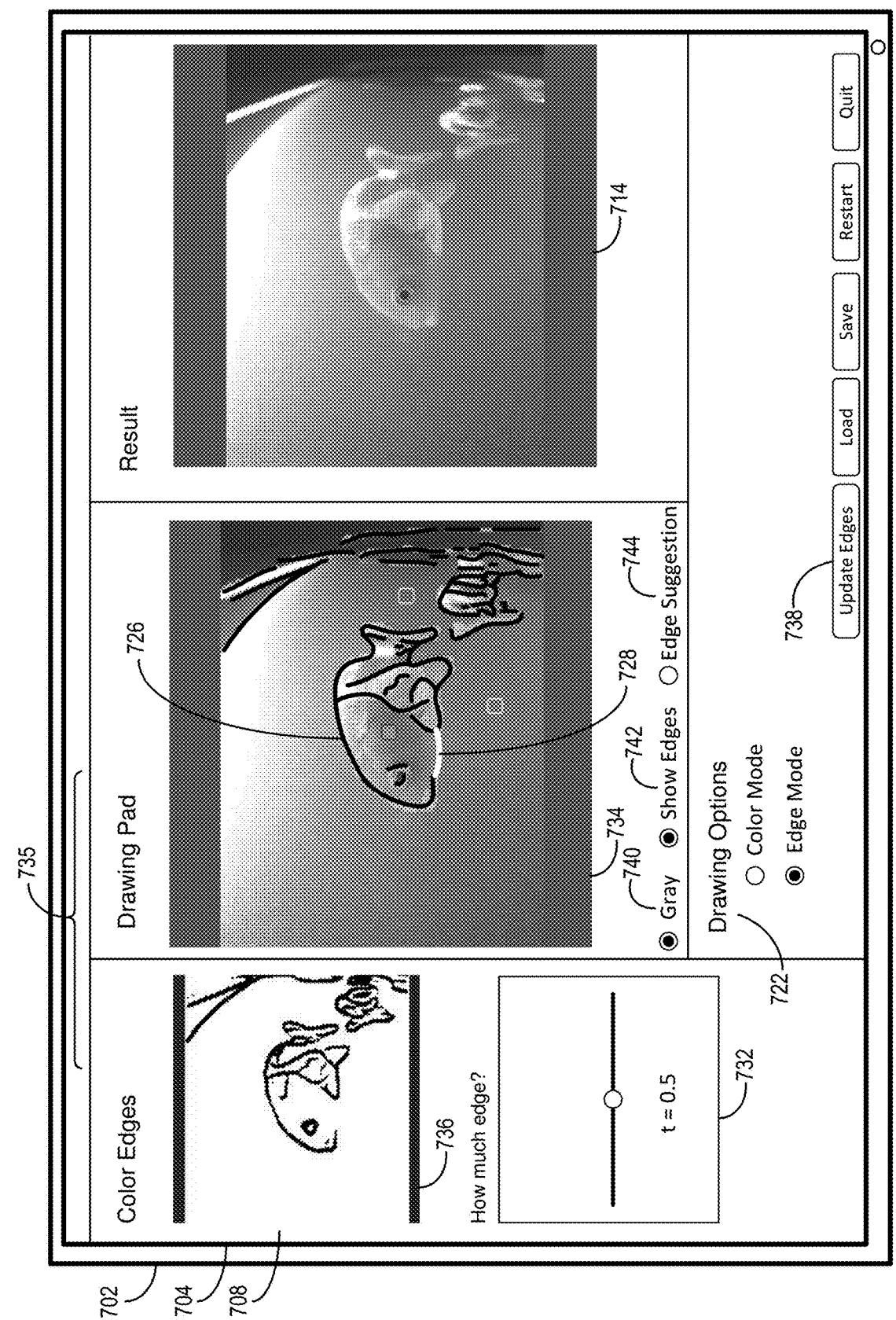

Additionally, the edge-guided colorization system 106 can detect user interaction with the user-drawn edge element 322 to determine the color edge modifications 310. In at least one embodiment, the edge-guided colorization system 106 presents the user-drawn edge element 322 to a user. The user can, via the user-drawn edge element 322, manually input additional user-drawn edges. The edge-guided colorization system 106 includes the user-drawn edges in the modified edge map 324. FIGS. 5 and 7A-7B and the accompanying discussion provide additional detail regarding the user-drawn edge element 322.

As further illustrated in FIG. 3, the edge-guided colorization system 106 utilizes the edge-guided colorization neural network 314 to generate the colorized image 316. The edge-guided colorization system 106 utilizes the modified edge map 324, the user color points 312, and the grayscale digital image 302 as input into the edge-guided colorization neural network 314. For example, the edge-guided colorization system 106 can generate a grayscale channel reflecting the grayscale digital image 302 (e.g., a vector representation of the pixels of the grayscale digital image 302). Similarly, the edge-guided colorization system 106 can generate a color point channel reflecting the user color points 312 (e.g., a vector representation of pixel locations and colors selected by a user). Moreover, the edge-guided colorization system can generate an edge map channel reflecting the modified edge map 324 (e.g., a vector representation of pixels corresponding to color edges). The edge-guided colorization system 106 can analyze these input channels via the edge-guided colorization neural network 314 to generate the colorized image 316.

As illustrated in FIG. 3, the edge-guided colorization system 106 receives the user color points 312 via the colorization graphical user interface. The user color points 312 include user-indicated color samples at various locations within the colorized image 316. As discussed above, the edge-guided colorization system 106 can analyze the color points 312 utilizing the edge-guided colorization neural network 314 to generate a colorized image that accurately reflects the selected color points.

Figure 6B:
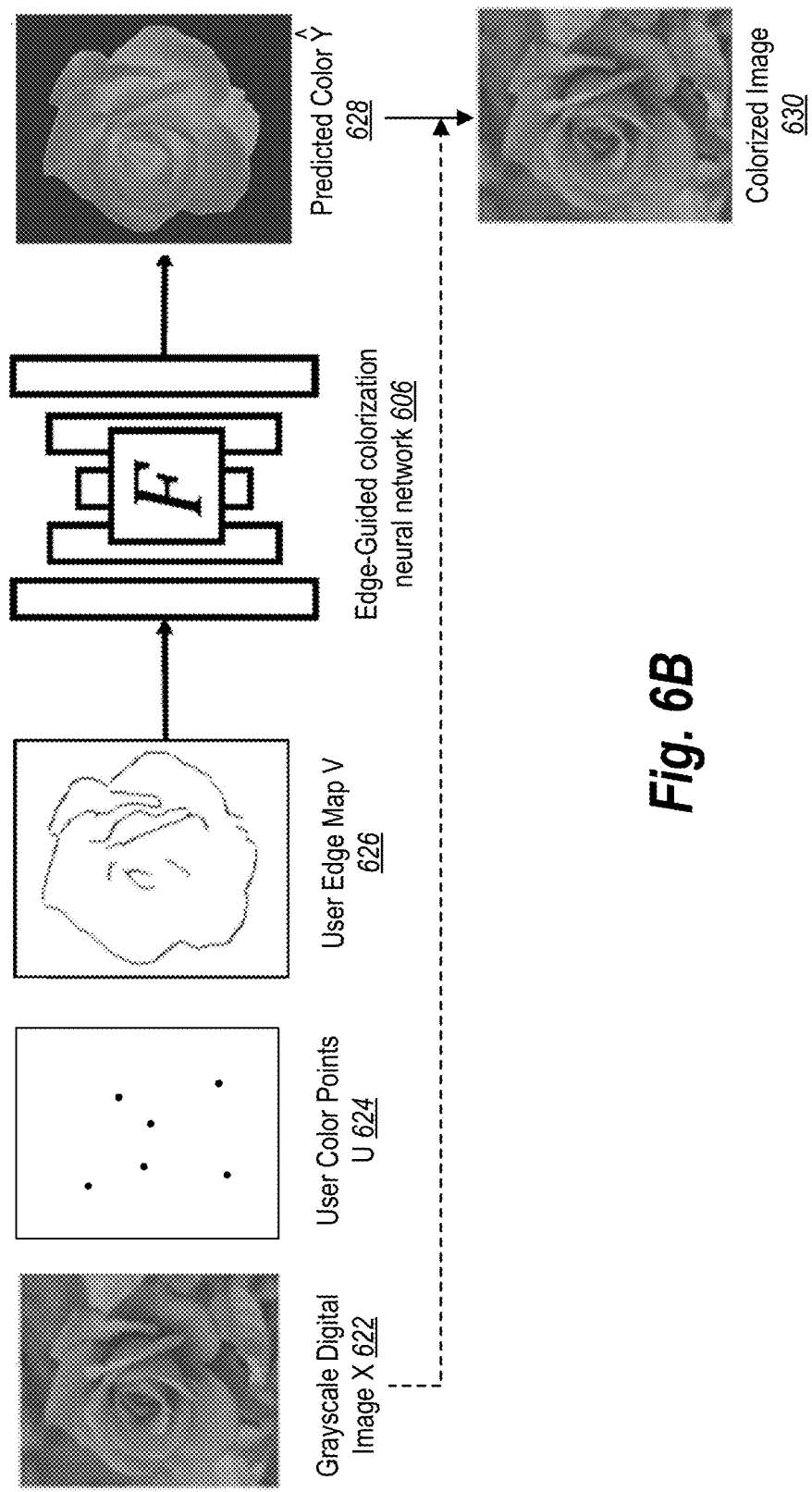

As discussed above, the edge guided-colorization neural network 106 can include a deep convolutional neural network with a plurality of layers. These intermediate layers can generate and analyze feature maps at different levels of abstraction to generate a predicted colorized image. For example, different convolutional layers can generate feature vectors of different dimensionality and feed these latent vectors to additional convolutional layers. At each layer, learned weighting parameters can emphasize different features that are significant to generate an accurate prediction output. In some embodiments, the edge-guided colorization system 106 concatenates the modified edge map 324 into all (or a subset of) feature maps analyzed at intermediate layers of the edge-guided colorization neural network 314. By emphasizing the edge map at multiple intermediate layers of the edge-guided colorization neural network 314, the edge-guided colorization system 106 can reduce color bleeding and improve accuracy of the colorized image 316. FIGS. 6A-6B and the accompanying discussion further describe how the edge-guided colorization system 106 trains and applies the edge-guided colorization neural network 314.

Thus, as illustrated in FIG. 3, the edge-guided colorization system 106 analyzes the modified edge map 324 (or the color edge map 306 if the edge-guided colorization system 106 does not receive the color edge modifications 310), the user color points 312, and the grayscale digital image 302 utilizing an edge-guided colorization neural network 314. The edge-guided colorization system 106 utilizes the edge-guided colorization neural network 314 to generate a colorized image 316. Because the edge-guided colorization neural network 314 relies on the input of color edges, the color edge prediction neural network 304 can be viewed as a preprocessing step. The color edge prediction neural network 304 improves efficiency because (1) requiring a user to manually input color edges is costly of both time and computing resources and (2) users may not intuitively understand the concept of an "edge" if starting from a blank canvas. Thus, the color edge prediction neural network 304 provides an initialization by predicting the color edge map 306 based on the grayscale digital image 302.

Although FIG. 3 illustrates utilizing the modified edge map 324 as input into the edge-guided colorization neural network 314, the edge-guided colorization system 106 may also use the color edge map 306 as input to the edge-guided colorization neural network 314. More specifically, in one or more embodiments, the edge-guided colorization system 106 may automatically generate the colorized image 316 without receiving the color edge modifications 310. The edge-guided colorization system 106 may present the colorized image 316 as a preview to the user or as a finished product.

Figure 4A:
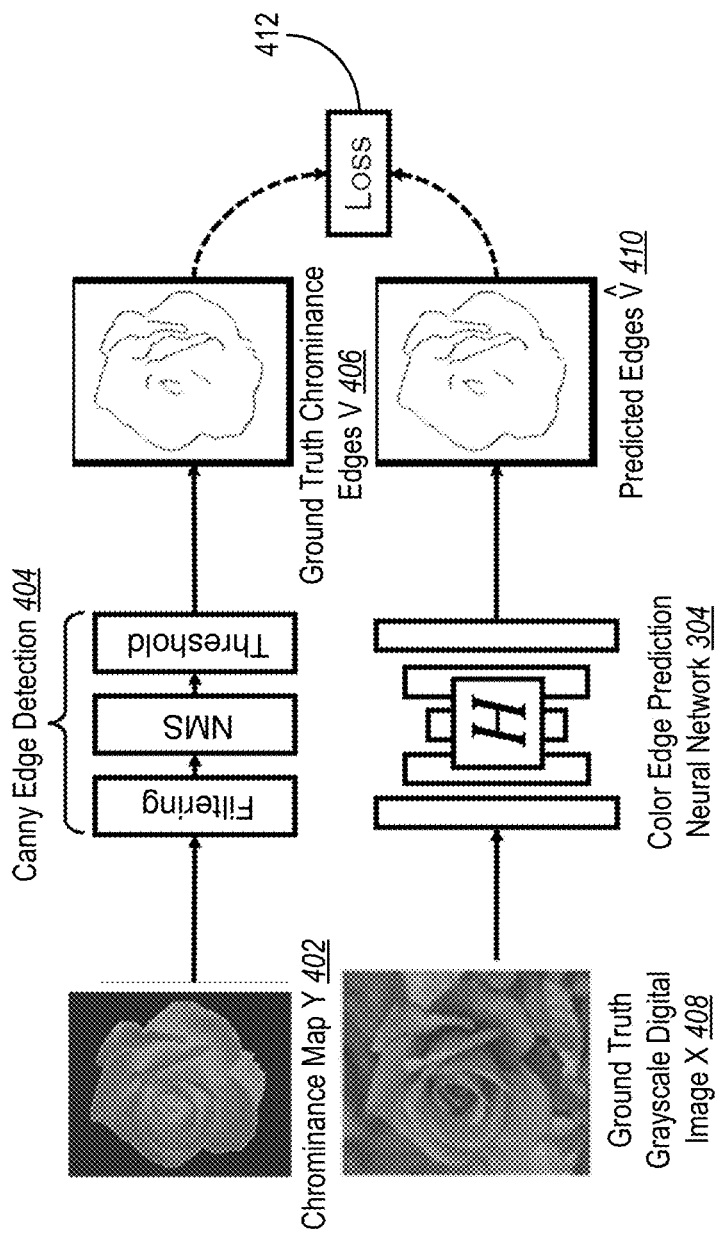
FIGS. 4A-4B illustrate the edge-guided colorization system training and applying a color edge prediction neural network to generate a color edge map in accordance with one or more embodiments of the present disclosure.
Figure 4B:
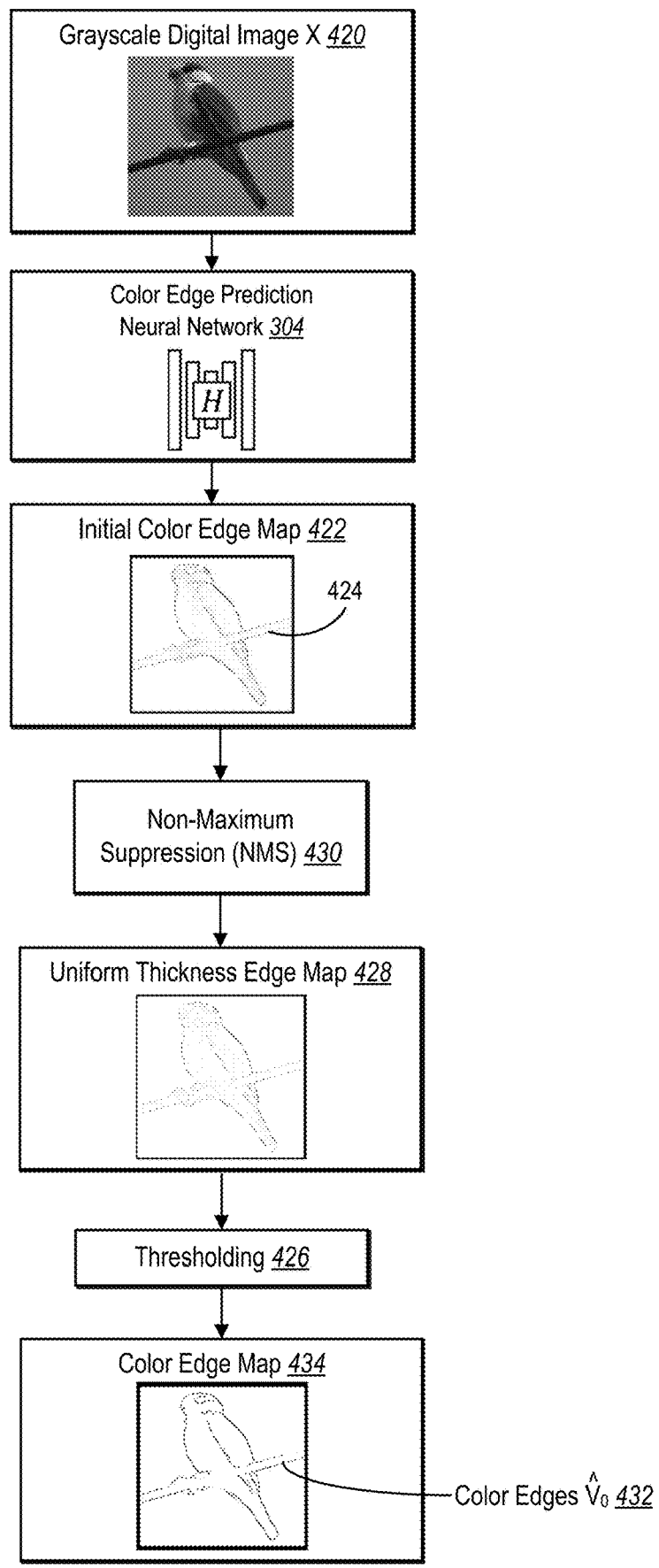

FIGS. 4A-4B provide additional detail regarding how the edge-guided colorization system 106 trains and applies the color edge prediction neural network 304 in accordance with one or more embodiments. More specifically, FIG. 4A illustrates the edge-guided colorization system 106 training the color edge prediction neural network 304, and FIG. 4B illustrates the edge-guided colorization system 106 applying the color edge prediction neural network 304 to generate the color edge map 306 comprising color edges.

As illustrated in FIG. 4A, during training, the edge-guided colorization system 106 applies canny edge detection 404 to a chrominance map Y 402 to generate ground truth chrominance edges V 406. Additionally, the edge-guided colorization system 106 uses a ground truth grayscale digital image X 408 as input into the color edge prediction neural network 304 to generate predicted edges $\hat{V}$ 410. The edge-guided colorization system 106 compares the ground truth chrominance edges V 406 with the predicted edges $\hat{V}$ 410 and applies the loss function 412. Based on the loss function 412, the edge-guided colorization system 106 trains the parameters of the color edge prediction neural network 304.

The edge-guided colorization system 106 extracts chrominance values from the ground truth color image to generate a chrominance map Y 402. As used herein, the term "chrominance map" refers to an image reflecting chrominance values. In particular, a chrominance map conveys color information of an image (e.g., as opposed to brightness information). For example, the chrominance map Y 402 of FIG. 4A represents a chrominance map of a ground truth color image of a rose.

During training, the edge-guided colorization system 106 runs Canny edge detection 404 on the chrominance map Y 402 to generate the ground truth chrominance edges V 406. In relation to FIG. 4, the Canny edge detection 404 includes three portions: filtering, non-maximum suppression (NMS), thresholding, and hysteresis. During filtering, the edge-guided colorization system 106 applies a filter to smooth the chrominance map Y 402 in order to remove noise. For example, the edge-guided colorization system 106 applies a Gaussian filter. After the edge-guided colorization system 106 applies filtering, the resulting image may include edges of varying thickness. Thus, the edge-guided colorization system 106 applies NMS to thin the edges to a more uniform thickness. In at least one embodiment, the edge-guided colorization system 106 applies NMS to thin the edges to 1-pixel width. The edge-guided colorization system 106 also applies thresholding to remove filter responses that fall below a certain threshold. Additionally, in at least one embodiment, the edge-guided colorization system 106 applies hysteresis to produce continuous edges. For example, the edge-guided colorization system 106 can utilize an edge-tracking algorithm to remove floating weak edges and connect weak edges to strong edges.

By applying the Canny edge detection 404 to the chrominance map Y 402, the edge-guided colorization system 106 generates the ground truth chrominance edges V 406. The ground truth chrominance edges V 406 indicate chrominance boundaries or where chrominance values (i.e., colors) change in the chrominance map Y 402. As mentioned, the ground truth chrominance edges V 406 comprise binary edges of a uniform thickness.

As further illustrated in FIG. 4A, the edge-guided colorization system 106 inputs the ground truth grayscale digital image X 408 into the color edge prediction neural network 304. The edge-guided colorization system 106 extracts intensity values from the ground truth color image to generate the ground truth grayscale digital image X 408. The edge-guided colorization system 106 uses the ground truth grayscale digital image X 408 as input to the color edge prediction neural network 304. The color edge prediction neural network 304 generates the predicted edges $\hat{V}$ 410.

The edge-guided colorization system 106 also applies the loss function 412. The edge-guided colorization system 106 performs a per-pixel classification comparison between the ground truth chrominance edges V 406 and the predicted edges $\hat{V}$ 410. For example, the edge-guided colorization system 106 can adjust the parameters of the color edge prediction neural network 304 to minimize a binary cross-entropy loss function $\mathcal{L}_{cl}$ given by:

$$\mathcal{H}^* = \arg^{min}_{\mathcal{H}} \mathcal{L}_{cl}(\mathcal{H}(X), V)$$

where X represents the ground truth grayscale digital image X 408, V represents the ground truth chrominance edges V 406, and $\mathcal{H}$ represents the color edge prediction neural network 304. The edge-guided colorization system 106 trains the network $\mathcal{H}$ to minimize expended classification loss ($\mathcal{L}_{cl}$) over the training set of ground truth color images. In some embodiments, the edge-guided colorization system 106 can utilize alternative loss functions, such as mean squared error, quadratic loss, L2 loss, L1 loss, or mean bias error. Moreover, the edge-guided colorization system 106 can update parameters of the neural network based on the loss function (e.g., through back-propagation).

FIG. 4A illustrates the edge-guided colorization system 106 training the color edge prediction neural network 304. FIG. 4B illustrates the edge-guided colorization system 106 applying the color edge prediction neural network 304 to generate a color edge map (i.e., the color edge map 306). The edge-guided colorization system 106 applies the color edge prediction neural network 304 to a grayscale digital image X 420. The color edge prediction neural network 304 generates an initial color edge map 422 based on the grayscale digital image X 420. The edge-guided colorization system 106 applies Non-Maximum Suppression (NMS) 430 (or simply "NMS 430") and thresholding 426 to the initial color edge map 422 to generate a color edge map 434.

As illustrated in FIG. 4B, the color edge prediction neural network 304 generates the initial color edge map 422. The initial color edge map 422 comprises initial edges 424. Whereas the ground truth chrominance edges V 406 used during training comprise binary edges, the initial edges 424 of the initial color edge map 422 are a soft value. For example, as illustrated in FIG. 4B, the set of initial edges 424 of the initial color edge map 422 include weak edges, shading, and other soft features in contrast to the continuous and uniformly thick edges of the ground truth chrominance edges V 406. Thus, the edge-guided colorization system 106 applies post processing steps comprising NMS 430 and thresholding 426 to binarize the initial color edge map 422.

As illustrated in FIG. 4B, the edge-guided colorization system 106 applies NMS 430 to the initial edges 424 of the initial color edge map 422. As previously mentioned, applying the NMS 430 adjusts pixel width to a uniform thickness. Thus, the edge-guided colorization system 106 generates a uniform thickness edge map 428 in which color edges are a uniform thickness. In at least one embodiment, the edge-guided colorization system 106 applies NMS 430 so the color edges of the uniform thickness edge map 428 are a 1-pixel width.

As further illustrated in FIG. 4B, the edge-guided colorization system 106 applies thresholding 426 to the uniform thickness edge map 428. The color edge prediction neural network 304 generates confidence scores (e.g., for each of the color edges that ultimately appear in the uniform thickness edge map 428). During thresholding 426, the edge-guided colorization system 106 determines a threshold t∈[0, 1], where t represents the threshold, and the values range from 0 to 1. As part of thresholding 426, the edge-guided colorization system 106 removes edges of the color edges whose confidence scores fall below the determined threshold. Based on the thresholding 426, the edge-guided colorization system 106 generates the color edge map 434 that contains only edges of the uniform thickness edge map 428 whose confidence scores meet the determined threshold. For example, as illustrated in FIG. 4B, the color edge map 434 contains fewer shadows and other soft values than the uniform thickness edge map 428.

The edge-guided colorization system 106 can utilize a predetermined threshold value as the color edge threshold. For example, in at least one embodiment, the edge-guided colorization system 106 utilizes a predetermined color edge threshold (e.g., t=0.17) to generate the color edge map 434. As mentioned previously with respect to FIG. 3, the edge-guided colorization system 106 can present, via a colorization graphical user interface, the color edge map 434 resulting from the color edge threshold. The colorization graphical user interface can include the color edge threshold element 318. In at least one embodiment, the color edge threshold element is a sliding bar indicating the color edge threshold. Based on user interaction with the color edge threshold element (e.g., sliding the bar to indicate a different threshold value), the edge-guided colorization system 106 can determine a modified edge threshold. In such circumstances, the edge-guided colorization system 106 can utilize the modified edge threshold to generate a modified thresholded edge map and subsequently (after NMS, thresholding, and hysteresis) a modified edge map. FIG. 5 and the accompanying discussion provide additional detail regarding how the edge-guided colorization system 106 generates the modified edge map.

Although not illustrated in FIG. 4B, the edge-guided colorization system 106 also applies hysteresis in addition to NMS 430 and thresholding 426. As mentioned, by utilizing hysteresis, the edge-guided colorization system 106 ensures that the color edges Vo 432 of the color edge map 434 are continuous and connected.

Similarly, although FIG. 4B is generally described in relation to applying the color edge prediction neural network to a grayscale digital image X 420, the edge-guided colorization system 106 can also utilize NMS, thresholding, and other post-processing acts in training. For example, in generating the predicted edges $\hat{V}$ 410, the edge-guided colorization system 106 can apply similar post-processing so that the output of the color edge prediction neural network 304 is readily comparable to the ground truth chrominance edges V 406.

As described above, the edge-guided colorization system 106 can present a color edge map to a user via a colorization graphical user interface and receives color edge modifications. Based on the color edge modifications, the edge-guided colorization system 106 can generate a modified edge map. FIG. 5 illustrates the edge-guided colorization system 106 generating a modified edge map (i.e., the modified edge map 324) in accordance with one or more embodiments.

As illustrated in FIG. 5, the edge-guided colorization system 106 presents the color edge map 306 via a colorization graphical user interface 504. The colorization graphical user interface 504 comprises the color edge threshold element 318, the edge suggestion element 320, and the user-drawn edge element 322. Based on user interactions with the color edge threshold element 318, the edge suggestion element 320, and the user-drawn edge element 322, the edge-guided colorization system 106 generates the modified edge map 324.

As illustrated in FIG. 5, the color edge threshold element 318 comprises an interactive sliding scale. In at least one embodiment, the edge-guided colorization system 106 presents, via the color edge threshold element 318, the color edge threshold. For example, the color edge threshold element 318 may indicate that the edge-guided colorization system 106 generated the color edge map 306 using the color edge threshold t=0.17. The edge-guided colorization system 106 receives user interaction with the color edge threshold element 318 to determine a modified edge threshold. For example, as illustrated in FIG. 5, the modified edge threshold t=0.50. The edge-guided colorization system 106 applies thresholding using the modified edge threshold to the uniform thickness edge map 428 to generate a modified thresholded edge map. As illustrated, because the modified edge threshold (t=0.50) is higher than the color edge threshold (t=0.17), the modified thresholded edge map contains fewer edges than the color edge map 306. Additionally, the edge-guided colorization system 106 applies hysteresis to the modified thresholded edge map to generate the modified edge map 324.

The colorization graphical user interface 504 also includes the edge suggestion element 320. The edge-guided colorization system 106 presents suggested edges to the user, and the edge-guided colorization system 106 includes one or more user selected edges of the suggested edges in the modified edge map 324. Color edges scan include a subset of luminance edges. Thus, in at least one embodiment, the edge-guided colorization system 106 presents, as suggested edges, luminance edges. As used herein, the term "luminance edges" refers to edges within a luminance map. In particular, a luminance map conveys brightness information of an image where each pixel corresponds to a brightness value. Luminance edges indicate locations or boundaries where brightness values change.

As illustrated in FIG. 5, the edge-guided colorization system 106 applies a Canny edge detector 506 to the colorized image to generate the luminance edges 508 for the grayscale digital image 302. In relation to FIG. 5, the Canny edge detector 506 performs the same process as in the Canny edge detection 404 of FIG. 4A. Specifically, the edge-guided colorization system 106 utilizes the Canny edge detector 506 to apply filtering, NMS, thresholding, and hysteresis to the grayscale digital image 302.

The edge-guided colorization system 106 presents the luminance edges 508 as suggested edges to the user via the colorization graphical user interface 504. Based on user selection of one or more edges of the luminance edges 508, the edge-guided colorization system 106 includes the one or more edges in the modified edge map 324.

As further illustrated in FIG. 5, the edge-guided colorization system 106 provides, within the colorization graphical user interface 504, the user-drawn edge element 322. The edge-guided colorization system 106 can receive additional edges via the user-drawn edge element 322. In particular, the edge-guided colorization system 106 receives hand-drawn input based on user interaction with the user-drawn edge element 322 and generates a user-drawn edge 510. The edge-guided colorization system 106 includes the user-drawn edge 510 within the modified set of color edges within the modified edge map 324.

As discussed above, the edge-guided colorization system 106 can utilize edge maps as input to the edge-guided colorization neural network to incorporate edge guidance. FIGS. 6A-6B illustrate the edge-guided colorization system 106 training and applying an edge-guided colorization neural network to generate a colorized image in accordance with one or more embodiments. The edge-guided colorization system 106 can predict colors for a grayscale image by incorporating user color points and edge guidance. In a CIE Lab space, the grayscale digital image comprises the L, or lightness channel, and the desired colorized image comprises the ab or color components.

FIG. 6A illustrates the edge-guided colorization system 106 training an edge-guided colorization neural network 606. The edge-guided colorization system 106 uses ground truth color Y 602, a training grayscale image X 604, training color points U 614, and Canny edges V 612 as input to the edge-guided colorization neural network 606. The edge-guided colorization neural network 606 generates training predicted color $\hat{Y}$ 608, which the edge-guided colorization system 106 compares with the ground truth color Y 602. The edge-guided colorization system 106 adjusts the parameters of the edge-guided colorization neural network 606 to reduce loss 610 between the training predicted color $\hat{Y}$ 608 and the ground truth color Y 602.

In relation to FIG. 6A, the edge-guided colorization system 106 generates training inputs for the edge-guided colorization neural network 606 from training ground truth color images. In particular, the edge-guided colorization system 106 isolates lightness values of a training ground truth color image to generate the training grayscale image X 604. The edge-guided colorization system 106 also isolates the chrominance values of the training ground truth color image to generate the ground truth color Y 602 corresponding to the training grayscale image X 604. Thus, in one or more embodiments, the ground truth color Y 602 comprises a chrominance map of the training color image. Furthermore, the edge-guided colorization system 106 extracts intensity or lightness values from the training color image to generate the training grayscale image X 604.

The edge-guided colorization neural network 606 incorporates edge guidance in generating colorized images. During training, the edge-guided colorization system 106 simulates user drawn edges using a projection function. In at least one embodiment, the edge-guided colorization system 106 projects edges by applying a Canny edge detector 620 to the ground truth color Y 602. The purpose of applying the Canny edge detector 620 is to denote regions where the chrominance value actually changes in a chrominance map (i.e., the ground truth color Y 602). Thus, in at least one embodiment, the edge-guided colorization system 106 utilizes a low-level edge detector. Additionally, in at least one embodiment, the edge-guided colorization system 106 extracts color edges at half resolution, instead of at full resolution, which often yields overly complex color edges. The edge-guided colorization system 106 uses the Canny edges V 612 to simulate the color edge map or modified edge map input during application.

During training, the edge-guided colorization system 106 utilizes the training color points U 614 as input to the edge-guided colorization neural network 606. The edge-guided colorization system 106 simulates user interactions by randomly revealing points (e.g., sampling pixels) in the ground truth color Y 602 to generate the training color points U 614. By sampling from ground truth colors and using the training color points U 614 as input, the edge-guided colorization system 106 trains the edge-guided colorization neural network 606 to rely on the training color points U 614. During application, the edge-guided colorization neural network 606 follows the user-provided colors, even without explicit constraint.

As illustrated in FIG. 6A, the edge-guided colorization neural network 606 generates the training predicted color $\hat{Y}$ 608. The training predicted color $\hat{Y}$ 608 comprises a predicted chrominance map that, when combined with the corresponding grayscale image (i.e., the training grayscale image X 604), creates a complete colorized image.

The edge-guided colorization system 106 compares the training predicted color $\hat{Y}$ 608 with the ground truth color Y 602 to adjust parameters of the edge-guided colorization neural network 606. The edge-guided colorization system 106 trains the edge-guided colorization neural network 606 parameters to map inputs training grayscale image X 604, training color points U 614, and canny edges V 612 as close to the ground truth color Y 602 as possible. In at least one embodiment, the edge-guided colorization system 106 utilizes a per-pixel $\ell_0$ regression loss by comparing each pixel of the training predicted color $\hat{Y}$ 608 with the corresponding pixel in the ground truth color Y 602. As mentioned previously, the edge-guided colorization system 106 can also utilize alternative loss functions.

During training, the edge-guided colorization system 106 incorporates the training grayscale image X 604, the training color points U 614, and the Canny edges V 612 as input into the edge-guided colorization neural network 606 $\mathcal{F}$ (X, U, V). The edge-guided colorization system 106 adjusts parameters of the edge-guided colorization neural network 606 to minimize the loss 610 with the following objective function:

$$\mathcal{F}^* = \arg\min_{\mathcal{F}} \mathcal{L}(\mathcal{F}(X, P_u(Y), P_v(Y)), Y)$$

where $\mathcal{L}$ represents a loss function that maps the output (i.e., training predicted color $\hat{Y}$ 608) of the edge-guided colorization neural network 606 $\mathcal{F}$ against the ground truth color Y 602. The function $P_u$ (Y) denotes user interactions simulated by randomly revealing points in the ground truth color Y 602 (i.e., the training color points U 614). The function $P_v$ (Y) simulates user drawn edges (i.e., the Canny edges V 612).

While FIG. 6A illustrates how the edge-guided colorization system 106 trains the edge-guided colorization neural network 606, FIG. 6B illustrates the edge-guided colorization system 106 applying the edge-guided colorization neural network 606 in accordance with one or more embodiments. During application, the edge-guided colorization system 106 analyzes a grayscale digital image X 622, user color points U 624, and user edge map V 626 using the edge-guided colorization neural network 606. Specifically, the edge-guided colorization system 106 generates a grayscale channel, a color points channel, and an edge map channel and analyzes these channels via the edge-guided colorization neural network 606. The edge-guided colorization neural network 606 generates predicted color $\hat{Y}$ 628, which the edge-guided colorization system 106 combines with the grayscale digital image X 622 to create the colorized image 630.

During application, the edge-guided colorization system 106 receives the grayscale digital image X 622 from the user. The edge-guided colorization system 106 utilizes the trained edge-guided colorization neural network 606 to generate the predicted color $\hat{Y}$ 628 for the received grayscale digital image X 622. The desired output comprises a colorized version of the grayscale digital image X 622.

The edge-guided colorization system 106 includes the user color points U 624 as input into the edge-guided colorization neural network 606. In at least one embodiment, the edge-guided colorization system 106 represents the user color points U 624 via a set of color point channels as $U \in \mathbb{R}^{H \times W \times 3}$, where the first two channels are user-selected chrominance values, and the third is a binary mask indicating whether the user has selected a color at that location. In at least one embodiment, the color points channel starts with all zeros and is sparsely populated as the edge-guided colorization system 106 receives user color points.

The edge-guided colorization system 106 receives the user color points U 624 via the colorization graphical user interface. For example, in at least one embodiment, the edge-guided colorization system 106 presents the grayscale image and an ab color gamut via the colorization graphical user interface. The edge-guided colorization system 106 receives selections of various points in the grayscale image and a selection of chrominance values on the color gamut that correspond to the various points. FIG. 7A and the accompanying discussion provide additional detail regarding how the edge-guided colorization system 106 receives the user color points U 624.

Additionally, the edge-guided colorization system 106 incorporates edge guidance from users by using the user edge map V 626 and corresponding edge map channel. The user edge map V 626 comprises the color edge map 434 if the user has not modified the color edge map 434. Alternatively, if the edge-guided colorization system 106 receives user modifications to the color edge map 434, the user edge map V 626 comprises the modified edge map 324. In at least one embodiment, the edge-guided colorization system 106 denotes the user edge map V 626 via an edge map channel as a sparse binary matrix. More specifically, the edge-guided colorization system 106 denotes user edge map V 626 through an edge map channel as $V \in \mathbb{B}^{H \times W \times 1}$ representing the presence or absence of edges.

As previously mentioned, the edge-guided colorization system 106 trains the edge-guided colorization neural network 606 to map the grayscale digital image X 622, the user color points U 624, and the user edge map V 626 to output the predicted color $\hat{Y}$ 628. Additionally, in some embodiments, the edge-guided colorization system 106 concatenates the user edge map V 626 into feature vectors at all intermediate layers of the neural network. In at least one embodiment, the edge-guided colorization neural network 606 comprises a U-Net convolutional neural network.

As illustrated in FIG. 6B, the edge-guided colorization neural network 606 generates the predicted color $\hat{Y}$ 628. The predicted color $\hat{Y}$ 628 comprises a predicted chrominance map corresponding to the grayscale digital image X 622. In particular, the predicted color $\hat{Y}$ 628 comprises chrominance values for each pixel in the grayscale digital image X 622. Furthermore, the predicted color $\hat{Y}$ 628 reflects the edge guidance integrated by the edge-guided colorization neural network 606.

The edge-guided colorization system 106 can generate the colorized image 630 by combining the chrominance or color values of the predicted color $\hat{Y}$ 628 with the lightness values of the grayscale digital image X 622. For example, the edge-guided colorization system 106 can generate the colorized image 630 within the CIE Lab space by combining the L values of the grayscale digital image X 622 with the ab values of the predicted color $\hat{Y}$ 628. The edge-guided colorization system 106 presents the colorized image 630 to the user via the colorization graphical user interface.

As mentioned, in at least one embodiment, the edge-guided colorization system 106 feeds the user edge map V 626 into a plurality of layers of the edge-guided colorization neural network 606. For example, the edge-guided colorization system 106 can concatenate the user edge map V 626 into feature vectors at each layer of the edge-guided colorization neural network 606. In another embodiment, the edge-guided colorization system 106 feeds the user edge map V 626 into multiple, but not all layers, of the edge-guided colorization neural network 606.

In particular, as discussed above, the edge-guided colorization neural network 606 can include a variety of layers that perform operations on feature vectors based on learned weights/parameters. Thus, any particular layer can receive, as input, an input feature vector and generate an output feature vector. The edge-guided colorization system 106 can add (i.e., concatenate) the user edge map V 626 to the feature vectors of a plurality of layers of the edge-guided colorization neural network 606. Thus, the edge-guided colorization system 106 emphasizes the user edge map V 626 at multiple intermediate layers of the edge-guided colorization neural network 314.

Furthermore, the edge-guided colorization system 106 can adjust the size and dimensionality of the user edge map V 626 for the feature vectors of each layer of the edge-guided colorization neural network 606. In particular, layers of the edge-guided colorization neural network 606 may be different sizes to analyze the grayscale digital image X 622 at different levels of detail. Thus, the edge-guided colorization system 106 can adjust the size of the user edge map V 626 to match the corresponding layer of the edge-guided colorization neural network 606.

To illustrate, the edge-guided colorization system 106 can analyze a grayscale channel, a color edge map channel, and/or a color point channel utilize a first layer (e.g., a first convolutional layer) of the edge-guided colorization neural network 606 to generate a feature vector. The edge-guided colorization system 106 can add (e.g., concatenate or otherwise append) the edge map to the feature vector to generate an edge-map modified feature vector. The edge-guided colorization system 106 can then analyze the edge-map modified feature vector utilizing a second layer (e.g., a second convolutional layer) of the edge-guided colorization neural network 606. The edge-guided colorization system can iteratively add the edge map (at different sizes or scales) at different layers of the neural network.

The edge-guided colorization system 106 receives various user interactions to generate inputs for the edge-guided colorization neural network 606. For example, the edge-guided colorization system 106 receives the user color points U 624 via a colorization graphical user interface. Additionally, the edge-guided colorization system 106 receives inputs including the color edge modifications 310 to generate the user edge map V 626. FIGS. 7A-7B illustrate an example colorization graphical user interface. More particularly, FIG. 7A illustrates how the edge-guided colorization system 106 receives the user color points U 624 via the colorization graphical user interface in a color mode in accordance with one or more embodiments. FIG. 7B illustrates how the edge-guided colorization system 106 receives the color edge modifications 310 via the colorization graphical user interface in an edge mode in accordance with one or more embodiments. Although FIGS. 7A and 7B illustrate a series of example colorization graphical user interfaces, it will be appreciated that the edge-guided colorization system 106 can utilize different colorization graphical user interfaces comprising different configurations or different user interface elements.

As illustrated in FIG. 7A, in the color mode, the edge-guided colorization system 106 presents a colorization graphical user interface 706 via a display screen 704 on the user client device 702 (i.e., the user client device 108). As shown, the colorization graphical user interface 706 comprises a color point input element 709 by which the edge-guided colorization system 106 receives user input of the user color points U 624. The color point input element 709 includes a color selection element 710, a point selection element 712, suggested colors 716, recently used colors 718, and a selected color 720. Additionally, as illustrated in FIG. 7A, the colorization graphical user interface 706 in color mode includes drawing options selection element 722, load element 725, load element 727, restart element 729, and quit element 730.

As illustrated by the drawing options selection element 722, the colorization graphical user interface 706 of FIG. 7A is in color mode. Based on user interaction with the drawing options selection element 722, the edge-guided colorization system 106 toggles between presenting the color point input element 708 for selecting the user color points U 624 and presenting color edge modification elements for generating the user edge map V 626. Based on user interaction with the color mode option of the drawing options selection element 722, the edge-guided colorization system 106 presents the color point input element 709 via the colorization graphical user interface 706.

Based on interaction with the point selection element 712, the edge-guided colorization system 106 identifies points for the user color points U 624. The point selection element 712 comprises the input grayscale digital image. The edge-guided colorization system 106 detects selection of regions in the point selection element 712 and associates user-selected colors with each of those points. Additionally, as illustrated, the edge-guided colorization system 106 displays, via the point selection element 712 which color points have already been selected and associated with color values.

The edge-guided colorization system 106 associates color values with selected color points in the point selection element 712. For example, the edge-guided colorization system detects user selection of selected color point 724 and highlights the selected color point 724 to indicate active color selection for pixels within the selected color point 724. The edge-guided colorization system 106 receives the color selection to associate with the selected color point 724 via the color selection element 710.

The edge-guided colorization system 106 presents the color selection element 710 as part of the color point input element 709. The color selection element 710 comprises a color gamut displaying the entire range of colors available for the selected color point 724. As illustrated, the color selection element 710 comprises an ab color gamut. The edge-guided colorization system 106 detects user interaction with the color selection element 710 and updates the selected color 720 to display the color currently selected by the icon in the color selection element 710.

In addition to presenting the color selection element 710, the edge-guided colorization system 106 presents the suggested colors 716. The edge-guided colorization system 106 predicts possible colors for the selected color point 724 and presents the possible colors in the suggested colors 716. In at least one embodiment, the edge-guided colorization system 106 uses a color prediction neural network to predict possible colors for a given point. The edge-guided colorization system 106 trains the color prediction neural network using training color and training grayscale images. Based on analyzing values of the training grayscale images, the edge-guided colorization system 106 generates predictions for colors. Additionally, the edge-guided colorization system 106 can improve accuracy of possible colors presented within the suggested colors 716 by associating colors for other color points. For instance, if the user indicates one color for a color point, the edge-guided colorization system 106 determines a lower likelihood that the same color will be used at a different color point.

As the edge-guided colorization system 106 receives color points U 624 via the color point input element 709, the edge-guided colorization system 106 updates the colorized image 714. The colorized image 714 comprises the input grayscale digital image with the predicted color determined by the edge-guided colorization neural network 606. In at least one embodiment, before receiving any color points, the edge-guided colorization system 106 generates the colorized image 714 using predicted colors. Thus, the edge-guided colorization system 106 can receive corrections to the predicted colors via the color point input element 709. In another embodiment, the edge-guided colorization system 106 presents a grayscale image as the colorized image 714 and updates the colorized image 714 by adding colors in real time based on received user color points.

As illustrated in FIG. 7A, the colorization graphical user interface 706 also includes the load element 727, the restart element 729, and the quit element 730. Based on interaction with the load element 725, the edge-guided colorization system 106 loads a different grayscale image for colorization. For example, the edge-guided colorization system 106 can access grayscale images stored at the user client device 702. Based on user selection of the load element 727, the edge-guided colorization system 106 saves entered user color points and the most current edge modifications. Based on user selection of the restart element 729, the edge-guided colorization system 106 removes all selected color points and edge modifications. In at least one embodiment, the load element 727 and the restart element 729 are specific color mode or edge mode. For example, based on user selection of the load element 727 in color mode, the edge-guided colorization system 106 saves the currently input color points. If the edge-guided colorization system 106 detects selection of the restart element 729 while in color mode, the edge-guided colorization system 106 resets only the color points but not the edges. Based on user selection of the quit element 730, the edge-guided colorization system 106 closes the colorization graphical user interface 706.

Based on user selection of edge mode of the drawing options selection element 722, the edge-guided colorization system 106 updates the colorization graphical user interface 706 to edge mode. FIG. 7B illustrates the colorization graphical user interface 706 in edge mode through which the edge-guided colorization system 106 receives edge modifications to generate an edge map. The edge-guided colorization system 106 presents the colorization graphical user interface 706 via the display screen 704 on the user client device 702. As illustrated in FIG. 7B, the edge-guided colorization system 106 presents, via the colorization graphical user interface 706, a color edge modification element 735. The color edge modification element 735 includes a modified edge map element 736, a color edge threshold element 732, and a user-drawn edge element 734 for input of color edge modifications. Additionally, the edge-guided colorization system 106 presents the drawing options selection element 722, a selectable gray element 740, a show edges element 742, an edge suggestion element 744, and an update edges element 738.

The edge-guided colorization system 106 presents, as part of the color edge modification element 735, the color edge threshold element 732. Based on interaction with the color edge threshold element 732, the edge-guided colorization system 106 determines a modified edge threshold used in thresholding the initial color edge map 422. Higher modified edge thresholds are linked to fewer color edges while a lower modified edge threshold yields more color edges. As illustrated in FIG. 7B, the color edge threshold element 732 comprises a sliding scale and an indication of the threshold value (e.g., t=0.5). The edge-guided colorization system 106 determines the modified edge threshold based on user interaction with the sliding scale or the threshold indication. For example, the edge-guided colorization system 106 modifies the edge threshold based on the user selecting or dragging the sliding scale. Additionally, the edge-guided colorization system 106 enables the user to manually enter the modified threshold value using the threshold value indication.

The edge-guided colorization system 106 also presents, as part of the color edge modification element 735, the user-drawn edge element 734. The user-drawn edge element 734 comprises an area in which the user can draw additional desired edges. Based on user interaction with (e.g., dragging a cursor across or clicking) the user-drawn edge element 734, the edge-guided colorization system 106 adds user-drawn edges to the modified edge map. For example, the edge-guided colorization system 106 adds a user-drawn edge 728 to the modified edge map element 736 in addition to color edges 726.

The edge-guided colorization system 106 determines what to display as part of the user-drawn edge element based on detected user interaction with the gray element 740 and the show edges element 742. As illustrated, the edge-guided colorization system 106 detects selection of the gray element 740 and therefore presents, within the user-drawn edge element 734, the uploaded grayscale image. Alternatively, in at least one embodiment, the edge-guided colorization system 106 presents the option to display only edges as part of the user-drawn edge element. Furthermore, based on selection of the show edges element 742, the edge-guided colorization system 106 displays the color edges 726. Based on detected deselection of the show edges element 742, the edge-guided colorization system 106 removes the color edges 726 and displays only the user-drawn edge 728.

The edge-guided colorization system 106 also includes the edge suggestion element 744 as part of the color edge modification element. Based on detecting user interaction with the edge suggestion element 744, the edge-guided colorization system 106 presents additional luminance edges as suggested edges. For example, in one embodiment, the edge-guided colorization system 106 presents an additional panel that displays the luminance edges of the grayscale image. In another embodiment, based on selection of the edge suggestion element 744, the edge-guided colorization system 106 overlays the luminance edges on top of the color edges 726 and the user-drawn edge 728 in the user-drawn edge element 734. For example, the edge-guided colorization system 106 presents the luminance edges as a different color than the color edges 726 and the user-drawn edge 728. Based on user selection of one or more edges of the luminance edges, the edge-guided colorization system 106 determines to include the one or more edges in the modified edge map. The edge-guided colorization system 106 highlights selected one or more edges of the luminance edges to indicate that the selected one or more edges will be included in the modified edge map.

As the edge-guided colorization system 106 receives user interaction through the color edge threshold element 732, the user-drawn edge element, and the edge suggestion element 744, the edge-guided colorization system 106 updates the modified edge map element 736 in real time. For example, the edge-guided colorization system 106 adds or removes edges in the modified edge map element 736 to illustrate the most recent changes to the modified edges.

As illustrated in FIG. 7B, the colorization graphical user interface 706 includes the colorized image 714. The edge-guided colorization system 106 presents the most recent predicted colorized image. In at least one embodiment, the edge-guided colorization system 106 refreshes the colorized image 714 based on user selection of the update edges element 738. In another embodiment, the edge-guided colorization system 106 automatically updates the colorized image 714 based on user interaction with the color edge modification element 735.

Although not illustrated in FIG. 7B, the edge-guided colorization system 106 also removes edges based on user interaction. In at least one embodiment, the edge-guided colorization system 106 presents a remove edge option via the colorization graphical user interface 706. Based on selection of the remove edge option and an edge of the color edges (e.g., displayed via the modified edge map element 736, the user-drawn edge element 734, or another edge display), the edge-guided colorization system 106 removes the selected edge from the modified edge map.

Figure 8:
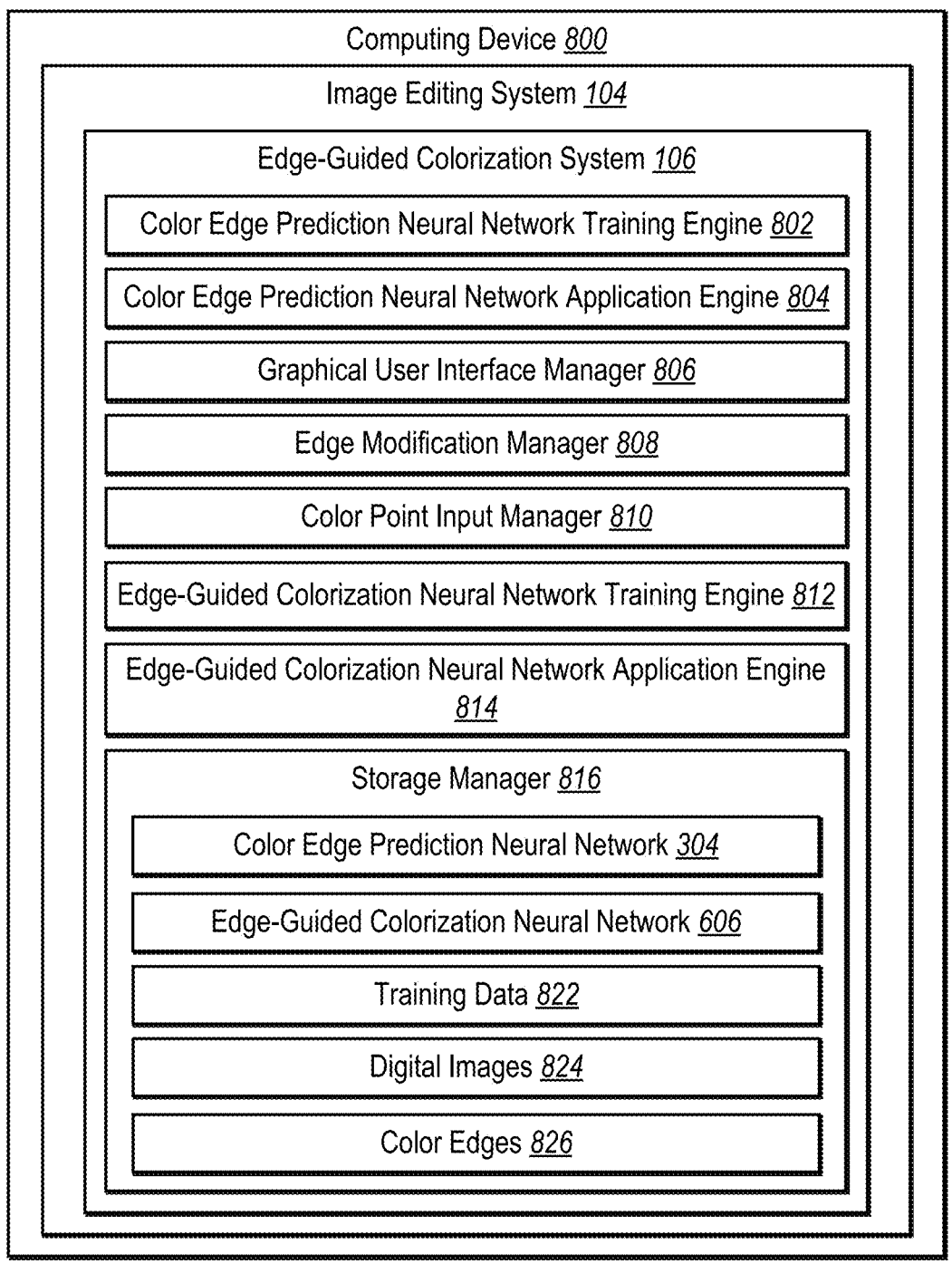
FIG. 8 illustrates a schematic diagram of an example architecture of an edge-guided colorization system in accordance with one or more embodiments of the present disclosure.

FIG. 8 illustrates a schematic diagram of components of the edge-guided colorization system 106 in accordance with one or more embodiments. As shown, the edge-guided colorization system 106 can be part of a computing device 800 (e.g., the user client device 108 and/or the server device(s) 102). Additionally, the edge-guided colorization system 106 can be part of the image editing system 104. The edge-guided colorization system 106 can include, but is not limited to, a color edge prediction neural network training engine 802, a color edge prediction neural network application engine 804, a graphical user interface manager 806, an edge modification manager 808, a color point input manager 810, an edge-guided colorization neural network training engine 812, an edge-guided colorization neural network application engine 814, and a storage manager 816. The edge-guided colorization system 106 can be implemented as part of the image editing system 104 in a distributed system of server devices for managing, storing, and editing digital images. Alternatively, the edge-guided colorization system 106 can be implemented on a single computing device such as the user client device 108 of FIG. 1.

In one or more embodiments, each of the components of the edge-guided colorization system 106 are in communication with one another using any suitable communication technologies. Additionally, the components of the edge-guided colorization system 106 can be in communication with one or more other devices including the user client device 108, as illustrated in FIG. 1. Although the components of the edge-guided colorization system 106 are shown as separate in FIG. 8, any of the subcomponents may be combined into fewer components, such as into a single component or divided into more components as may serve a particular implementation. Furthermore, although the components of FIG. 8 are described in connection with the edge-guided colorization system 106, at least some of the components for performing operations in conjunction with the edge-guided colorization system 106 described herein may be implemented on other devices within the environment.

The components of the edge-guided colorization system 106 can include software, hardware, or both. For example, the components of the edge-guided colorization system 106 can include one or more instructions stored on a computer-readable storage medium and executable by processors of one or more computing devices (e.g., the user client device 108). When executed by the one or more processors, the computer-executable instructions of the edge-guided colorization system 106 can cause the computing devices to perform the image editing methods described herein. Alternatively, the components of the edge-guided colorization system 106 can comprise hardware, such as a special purpose processing device to perform a certain function or group of functions. Additionally or alternatively, the components of the edge-guided colorization system 106 can include a combination of computer-executable instructions and hardware.

Furthermore, the components of the edge-guided colorization system 106 performing the functions described herein may, for example, be implemented as part of a stand-alone application, as a module of an application, as a plug-in for applications including content management applications, as a library function or functions that may be called by other applications, and/or as a cloud-computing model. Thus, the components of the edge-guided colorization system 106 may be implemented as part of a stand-alone application on a personal computing device or a mobile device. Alternatively or additionally, the components of the edge-guided colorization system 106 may be implemented in any application that allows creation and delivery of marketing content to users, including, but not limited to, applications in ADOBE® CREATIVE CLOUD®, such as ADOBE® PHOTOSHOP®, ADOBE® LIGHTROOM®, ADOBE® ILLUSTRATOR®, ADOBE® COLOR, and ADOBE® INDESIGN®. "ADOBE", "ADOBE PHOTOSHOP", "ADOBE LIGHTROOM", "ADOBE ILLUSTRATOR", "ADOBE COLOR", "ADOBE CREATIVE CLOUD", and "ADOBE INDESIGN" are registered trademarks of Adobe Inc in the United States and/or other countries.

As shown in FIG. 8, the edge-guided colorization system 106 includes the color edge prediction neural network training engine 802. The color edge prediction neural network training engine 802 trains network parameters of the color edge prediction neural network using training data. In particular, the color edge prediction neural network training engine 802 inputs ground truth grayscale digital images into the color edge prediction neural network to generate predicted edges. The color edge prediction neural network training engine 802 compares the predicted edges with ground truth data, including ground truth chrominance edges. Additionally, the color edge prediction neural network training engine 802 can determine, evaluate, identify, or generate a measure of loss or an error between the predicted edges and the ground truth data.

The edge-guided colorization system 106 also includes the color edge prediction neural network application engine 804. The color edge prediction neural network application engine 804 generates a color edge map based on receiving a grayscale digital image. The color edge prediction neural network application engine 804 manages the initial color edge maps comprising initial color edges and corresponding confidence scores generated by the color edge prediction neural network. Additionally, the color edge prediction neural network application engine 804 applies NMS and thresholding to the initial color edge map. Accordingly, the color edge prediction neural network application engine 804 accesses, manages, and stores color edge thresholds. Additionally, the color edge prediction neural network application engine 804 applies hysteresis to the thresholded edge map to generate the color edge map comprising color edges.

The edge-guided colorization system 106 also includes the graphical user interface manager 806. The graphical user interface manager 806 generates, manages, and receives input from one or more graphical user interfaces. The graphical user interface manager 806 generates, at the user client device 108, the colorization graphical user interface that presents the color edge map, a color edge threshold element, an edge suggestion element, and a user-drawn edge element. The graphical user interface manager 806 receives user interaction with one or more of the mentioned elements and communicates the user interactions to the edge modification manager 808. Additionally, the graphical user interface manager 806 presents data relevant to colorizing the grayscale image. For example, the graphical user interface manager 806 can display the grayscale image, the predicted colorized image, and other data via the user client device 108.

The edge modification manager 808 receives, implements, and manages color edge modifications to generate the modified edge map as input to the edge-guided colorization neural network. The edge modification manager 808 accesses user responses from the graphical user interface manager 806. In particular, the edge modification manager 808 adds and removes edges by determining a modified edge threshold. Additionally, the edge modification manager 808 adds user-drawn edges and one or more selected edges of luminance edges to the modified edge map. The edge modification manager 808 can also remove selected edges to generate a modified edge map.

As illustrated in FIG. 8, the edge-guided colorization system 106 also includes the color point input manager 810. The color point input manager 810 communicates with the graphical user interface manager 806 to generate the user color points input to the edge-guided colorization neural network. The color point input manager 810 accesses, manages, and stores chrominance values for selected color points linked to any grayscale image.

The edge-guided colorization neural network training engine 812 is a part of the edge-guided colorization system 106. The edge-guided colorization neural network training engine 812 trains network parameters of the edge-guided colorization neural network using training data. In particular, the edge-guided colorization neural network training engine 812 accesses, manages, and stores training data including ground truth color images. In particular, the edge-guided colorization neural network training engine 812 separates a ground truth color image into a training grayscale image and ground truth color. The edge-guided colorization neural network training engine 812 extracts training color points and canny edges from the ground truth color and uses them in addition to the training grayscale image as input into the edge-guided colorization neural network. The edge-guided colorization neural network training engine 812 accesses the training predicted color output of the edge guided colorization network, compares the training predicted color output with the ground truth color, and changes network parameters of the edge-guided colorization neural network. The edge-guided colorization neural network training engine 812 can determine, evaluate, identify, or generate a measure of loss or an error between the training predicted color and the ground truth color.

The edge-guided colorization system 106 includes the edge-guided colorization neural network application engine 814. The edge-guided colorization neural network application engine 814 generates predicted color based on receiving a grayscale digital image, user color points, and/or a user edge map. The edge-guided colorization neural network application engine 814 communicates with the graphical user interface manager 806, the edge modification manager 808, and the color point input manager 810 to access the grayscale digital image, the user color points, and the user edge map inputs to the edge-guided colorization neural network. The edge-guided colorization neural network application engine 814 also manages predicted color outputs of the edge-guided colorization neural network. In at least one embodiment, the edge-guided colorization neural network application engine 814 also combines the predicted color with the grayscale digital image to generate a colorized image.

The edge-guided colorization system 106 includes the storage manager 816. The storage manager 816 stores (via one or more memory devices) the color edge prediction neural network 304, the edge-guided colorization neural network 606, training data 822, digital images 824, and/or color edges 826. The color edge prediction neural network 304 comprises the neural network trained, by the color edge prediction neural network training engine 802, to generate initial color edge maps based on receiving and analyzing grayscale digital images. The storage manager 816 stores trained network parameters of the color edge prediction neural network 304

The storage manager 816 also stores the edge-guided colorization neural network 606. The edge-guided colorization neural network training engine 812 trains the edge-guided colorization neural network 606 to generate predicted color based on receiving a grayscale digital image, user color points, and a user edge map. The storage manager 816 stores trained network parameters of the edge-guided colorization neural network 606.

The storage manager 816 also stores the training data 822. The training data 822 includes ground truth color images used to train the color edge prediction neural network 304 and the edge-guided colorization neural network 606. More particularly, for training the color edge prediction neural network 304, the training data 822 includes chrominance maps, ground truth grayscale digital images, and ground truth chrominance edges. For training the edge-guided colorization neural network 606, the training data 822 includes training grayscale images, training color points, canny edges, and ground truth color.

The storage manager 816 stores the digital images 824. The digital images 824 comprise grayscale images received from a user and corresponding colorized images generated by the edge-guided colorization neural network 606.

The storage manager 816 also stores the color edges 826. The color edges 826 include color edges of color edge maps utilized in generating the final colorized images. For example, the color edges 826 include the initial color edge maps and corresponding edge confidence scores generated by the color edge prediction neural network 304, uniform thickness edge maps, and color edge maps, and modified edge maps. Furthermore, the color edges 826 store luminance edges used as suggested edges.

Figure 9:
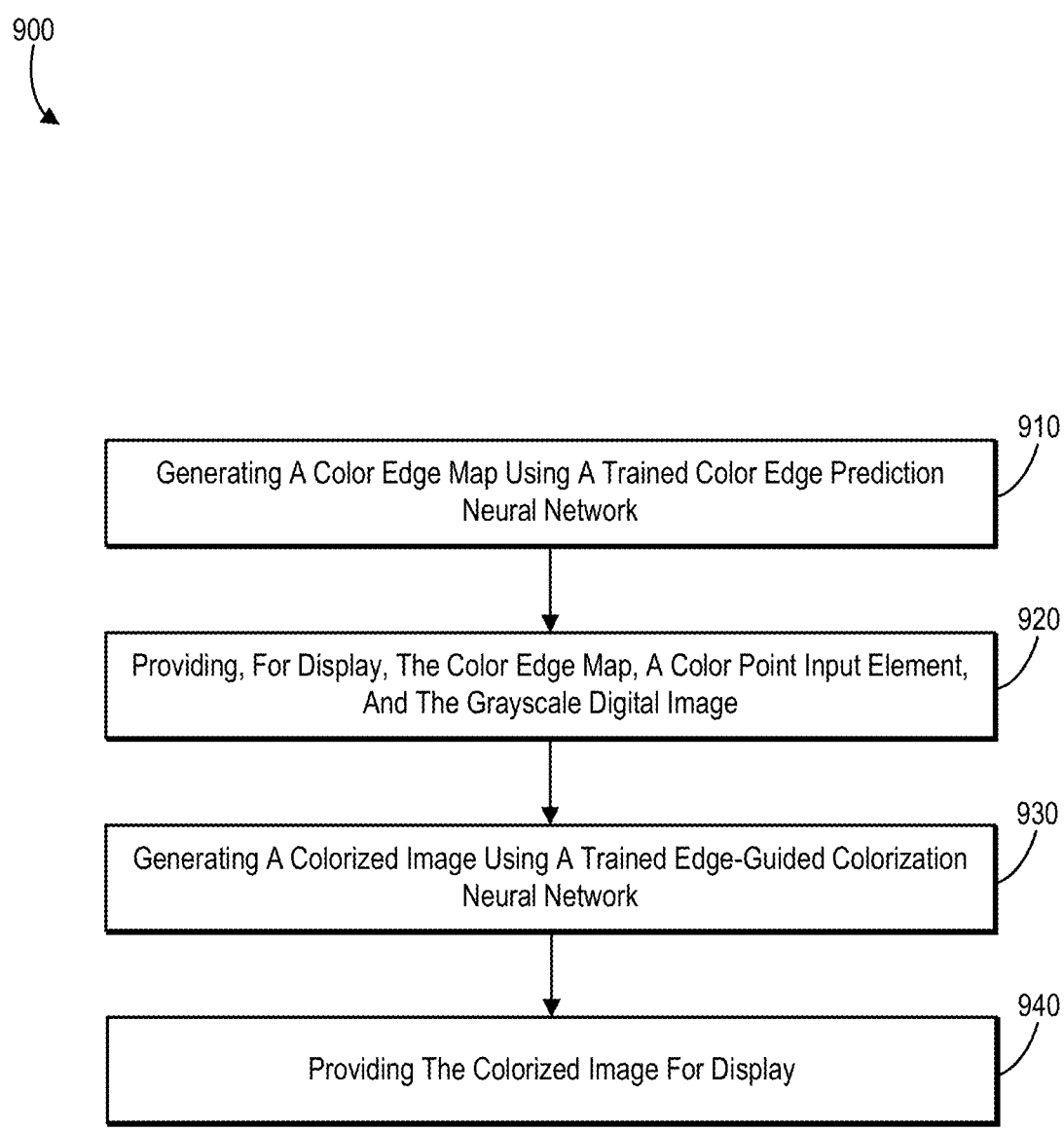
FIG. 9 illustrates a series of acts for generating a colorized image in accordance with one or more embodiments of the present disclosure.

FIG. 9 illustrates a flowchart of a method for generating a colorized image. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable medium can comprise instructions that, when executed by one or more processes, cause the computing device to perform the acts of FIG. 9. In still further embodiments, a system can perform the acts of FIG. 9.

As shown in FIG. 9, the series of acts 900 includes an act 910 of generating a color edge map using a trained color edge prediction neural network. In particular, the act 910 comprises generating a color edge map for a grayscale digital image using a color edge prediction neural network, wherein the color edge map comprises color edges. The act 910 further comprises the act of generating the color edge map by: generating an initial color edge map comprising initial edges utilizing the color edge prediction neural network; utilizing the color edge prediction neural network to determine a confidence score for each of the initial edges; and based on determining that a confidence score associated with an initial edge of the initial edges meets a color edge threshold, including the initial edge in the color edge map as a color edge of the color edges. The act 910 further comprises the act of generating the color edge map by utilizing non-maximum suppression to generate the color edge map from the initial color edge map.

The series of acts 900 includes an act 920 of providing, for display, the color edge map, a color point input element, and the grayscale digital image. In particular, the act 920 comprises providing, for display at a client device, a colorization graphical user interface comprising the color edge map, a color point input element, and the grayscale digital image.

The series of acts 900 also includes an act 930 of generating a colorized image using a trained edge-guided colorization neural network. In particular, the act 930 comprises generating a colorized image using an edge-guided colorization neural network based on the grayscale digital image, the color edge map, and user interaction with the color point input element.

In at least one embodiment, the act 930 further comprises the additional acts of generating a grayscale channel reflecting the grayscale digital image, a color edge map channel reflecting the color edge map, and a color point channel reflecting the user input; processing the grayscale channel and the color point channel utilizing the edge-guided colorization neural network to generate a first feature vector via a first layer of the edge-guided colorization neural network; concatenating the color edge map channel to the first feature vector to generate an edge-map modified feature vector; and processing the edge-map modified feature vector utilizing a second layer of the edge-guided colorization neural network.

The series of acts 900 includes an act 940 of providing the colorized image for display. In particular, the act 940 comprises providing the colorized image for display via the colorization graphical user interface.

In at least one embodiment, the series of acts 900 also includes the additional act of identifying user interaction with the color edge modification element via the colorization graphical user interface; generating a modified edge map by modifying color edges based on the user interaction with the color edge modification element.

The series of acts 900 can also include the additional acts of providing the colorized image for display via the colorization graphical user interface; generating a modified edge map based on user interaction with the color edge modification elements; and generating a modified colorized image using the edge-guided colorization neural network based on the grayscale digital image, the modified edge map, and the user interaction with the color point input element. Furthermore, in at least one embodiment, the color edge modification elements comprise a color edge threshold element, and the additional acts further comprise determining a modified edge threshold based on user interaction with the color edge threshold element; and including, in the modified edge map, a modified set of color edges based on the modified edge threshold.

Additionally, in at least one embodiment, the color edge modification elements comprise an edge suggestion element, and the additional acts further comprise generating the modified edge map by: based on user interaction with the edge suggestion element, generating, by utilizing a canny-edge detector, luminance edges of the grayscale digital image; presenting the luminance edges via the colorization graphical user interface; and based on user selection of one or more edges of the luminance edges, including the one or more edges in the modified edge map.

In at least one embodiment, the color edge modification elements comprise a user-drawn edge element, and the additional acts further comprise generating the modified edge map by: generating, based on user interaction with the user-drawn edge element, a user-drawn edge; and including the user-drawn edge in the modified edge map.

In addition (or in the alternative) to the acts described above, in some embodiments, the series of acts 900 include a step for using color edges to generate a colorized image from the grayscale digital image and the color points. For example, the acts described in reference to FIGS. 3, 4B, 5, and 6B can comprise the corresponding acts (or structure) for performing a step for using color edges to generate a colorized image from the grayscale digital image and the color points.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
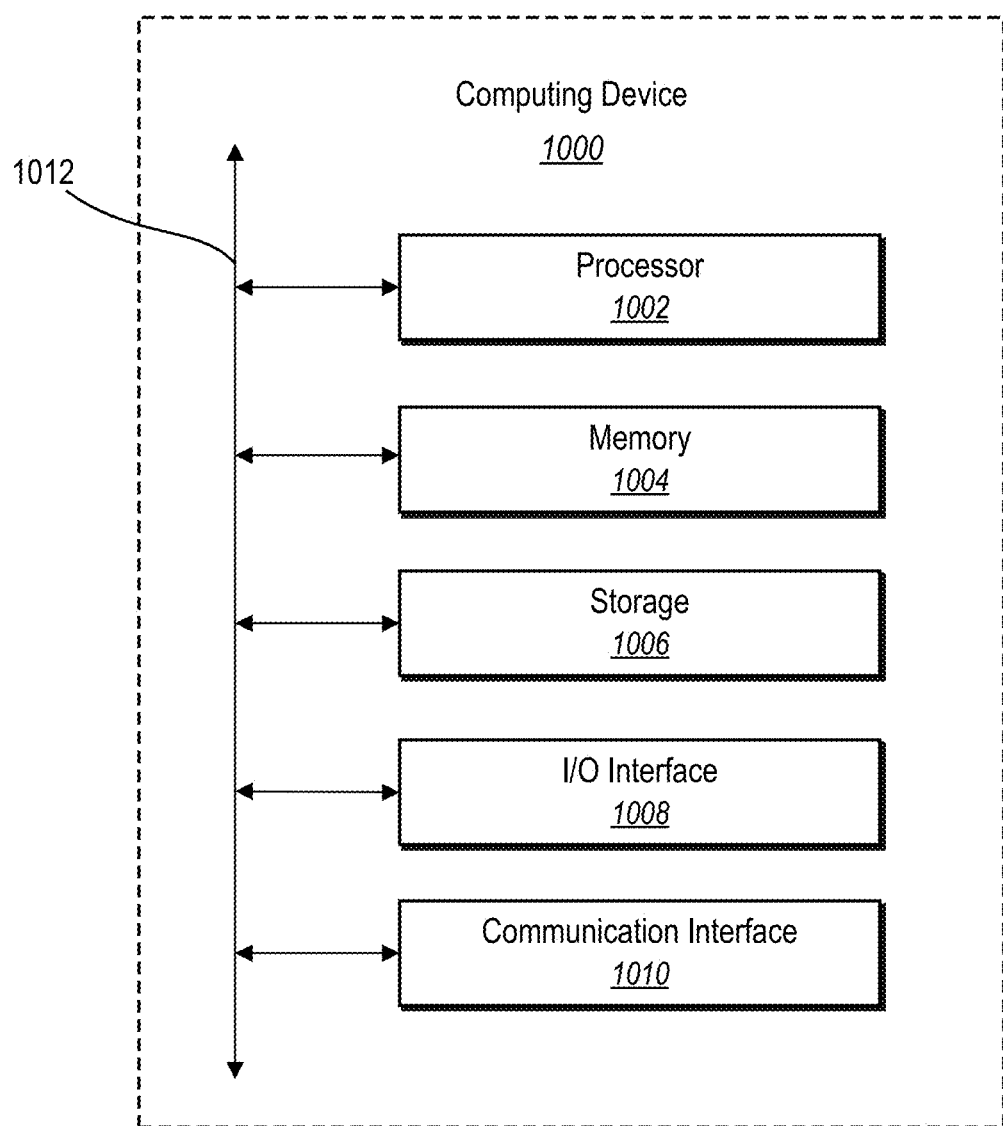
FIG. 10 illustrates a block diagram of an example computing device in accordance with one or more embodiments of the present disclosure.

FIG. 10 illustrates a block diagram of a computing device 1000 that may be configured to perform one or more of the processes described above. One will appreciate that one or more computing devices such as the computing device 1000 may implement the edge-guided colorization system 106 and the image editing system 104. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. In certain embodiments, the computing device 1000 can include fewer or more components than those shown in FIG. 10. Components of the computing device 1000 shown in FIG. 10 will now be described in additional detail.

In one or more embodiments, the processor 1002 includes hardware for executing instructions, such as those making up a computer program. As an example and not by way of limitation, to execute instructions for dynamically modifying workflows, the processor 1002 may retrieve (or fetch) the instructions from an internal register, an internal cache, the memory 1004, or the storage device 1006 and decode and execute them. The memory 1004 may be a volatile or non-volatile memory used for storing data, metadata, and programs for execution by the processor(s). The storage device 1006 includes storage, such as a hard disk, flash disk drive, or other digital storage device, for storing data or instructions for performing the methods described herein.

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example and not by way of limitation, the communication interface 1010 may include a network interface controller (NIC) or network adapter for communicating with an Ethernet or other wirebased network or a wireless NIC (WNIC) or wireless adapter for communicating with a wireless network, such as a WI-FI.

Additionally, the communication interface 1010 may facilitate communications with various types of wired or wireless networks. The communication interface 1010 may also facilitate communications using various communication protocols. The communication infrastructure 1012 may also include hardware, software, or both that couples components of the computing device 1000 to each other. For example, the communication interface 1010 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as digital messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable medium for generating colorized images, the non-transitory computer readable medium comprising instructions that, when executed by at least one processor, cause a computing device to:
   generate a color edge map for a grayscale digital image using a color edge prediction neural network, wherein the color edge map comprises color edges;
   provide, for display at a client device, a colorization graphical user interface comprising the color edge map, a color point input element, and the grayscale digital image;
   generate a colorized image using an edge-guided colorization neural network based on the grayscale digital image, the color edge map, and user interaction with the color point input element; and
   provide the colorized image for display via the colorization graphical user interface.

2. The non-transitory computer readable medium of claim 1, further comprising instructions that, when executed by the at least one processor, cause the computing device to:
   provide, for display as part of the colorization graphical user interface, the color edge map together with color edge modification elements;
   generate a modified edge map based on user interaction with the color edge modification elements; and
   generate a modified colorized image using the edge-guided colorization neural network based on the grayscale digital image, the modified edge map, and the user interaction with the color point input element.

3. The non-transitory computer readable medium of claim 2, further comprising instructions that, when executed by the at least one processor, cause the computing device to generate the color edge map by:
   generating an initial color edge map comprising initial edges utilizing the color edge prediction neural network;
   utilizing the color edge prediction neural network to determine a confidence score for each of the initial edges; and
   based on determining that a confidence score associated with an initial edge of the initial edges meets a color edge threshold, including the initial edge in the color edge map as a color edge of the color edges.

4. The non-transitory computer readable medium of claim 3, wherein the color edge modification elements comprise a color edge threshold element, and further comprising instructions that, when executed by the at least one processor, cause the computing device to generate the modified edge map by:
   determining a modified edge threshold based on user interaction with the color edge threshold element; and
   including, in the modified edge map, a modified set of color edges based on the modified edge threshold.

5. The non-transitory computer readable medium of claim 2, wherein the color edge modification elements comprise an edge suggestion element, and further comprising instructions that, when executed by the at least one processor, cause the computing device to generate the modified edge map by:
   based on user interaction with the edge suggestion element, generating, by utilizing a canny-edge detector, luminance edges of the grayscale digital image;
   presenting the luminance edges via the colorization graphical user interface; and
   based on user selection of one or more edges of the luminance edges, including the one or more edges in the modified edge map.

6. The non-transitory computer readable medium of claim 4, wherein the color edge modification elements comprise a user-drawn edge element, and further comprising instructions that, when executed by the at least one processor, cause the computing device to generate the modified edge map by:
   generating, based on user interaction with the user-drawn edge element, a user-drawn edge; and
   including the user-drawn edge in the modified edge map.

7. The non-transitory computer readable medium of claim 3, further comprising instructions that, when executed by the at least one processor, cause the computing device to generate the color edge map by utilizing non-maximum suppression to generate the color edge map from the initial color edge map.

8. The non-transitory computer readable medium of claim 1, further comprising instructions that, when executed by the at least one processor, cause the computing device to train the edge-guided colorization neural network by:
   applying a canny-edge detector to ground truth color corresponding to a ground truth color image to generate canny edges;

applying the edge-guided colorization neural network to a training grayscale image corresponding to the ground truth color image, training color points, and the canny edges;

utilizing the edge-guided colorization neural network to generate predicted color; and modifying parameters of the edge-guided colorization neural network by comparing the predicted color with the ground truth color.

9. The non-transitory computer readable medium of claim 1, further comprising instructions that, when executed by the at least one processor, cause the computing device to generate the colorized image by:

generating a grayscale channel reflecting the grayscale digital image, a color edge map channel reflecting the color edge map, and a color point channel reflecting the user input;

processing the grayscale channel and the color point channel utilizing the edge-guided colorization neural network to generate a first feature vector via a first layer of the edge-guided colorization neural network;

concatenating the color edge map channel to the first feature vector to generate an edge-map modified feature vector; and processing the edge-map modified feature vector utilizing a second layer of the edge-guided colorization neural network.

10. A system comprising:

one or more memory devices storing a grayscale digital image, a color edge prediction neural network, and an edge-guided colorization neural network;

at least one server configured to cause the system to:

use the color edge prediction neural network to generate a color edge map comprising color edges for the grayscale digital image;

provide, for display at a client device, a colorization graphical user interface comprising the color edge map, a color point input element, and a color edge modification element for modifying the color edges;

identifying user interaction with the color edge modification element via the colorization graphical user interface;

generate a modified edge map by modifying color edges based on the user interaction with the color edge modification element; and generate, using the edge-guided colorization neural network, a colorized image based on the modified edge map and user interaction with the color point input element.

11. The system of claim 10, further comprising instructions that, when executed by the at least one server, cause the system to generate the color edge map by:

generating an initial color edge map comprising initial edges utilizing the color edge prediction neural network;

utilizing the color edge prediction neural network to determine a confidence score for each of the initial edges; and based on determining that a confidence score associated with an initial edge of the initial edges meets a color edge threshold, including the initial edge in the color edge map as a color edge of the color edges.

12. The system of claim 11, wherein the color edge modification element comprises a color edge threshold element, and further comprising instructions that, when executed by the at least one server, cause the system to generate the modified edge map by:

determining a modified edge threshold based on user interaction with the color edge threshold element; and including, in the modified edge map, a modified set of color edges based on the modified edge threshold.

13. The system of claim 10, wherein the color edge modification element comprises an edge suggestion element, and further comprising instructions that, when executed by the at least one server, cause the system to generate the modified edge map by:

based on user interaction with the edge suggestion element, generating, by utilizing a canny-edge detector, luminance edges of the grayscale digital image;

presenting the luminance edges via the colorization graphical user interface; and based on user selection of one or more edges of the luminance edges, including the one or more edges in the modified edge map.

14. The system of claim 12, wherein the color edge modification element comprises a user-drawn edge element, and further comprising instructions that, when executed by the at least one server, cause the system to generate the modified edge map by:

generating, based on user interaction with the user-drawn edge element, a user-drawn edge; and including the user-drawn edge in the modified edge map.

15. The system of claim 11, further comprising instructions that, when executed by the at least one server, cause the system to generate the color edge map by utilizing non-maximum suppression to generate the color edge map from the initial color edge map.

16. The system of claim 10, further comprising instructions that, when executed by the at least one server, cause the system to train the edge-guided colorization neural network by:

applying a canny-edge detector to ground truth color corresponding to a ground truth color image to generate canny edges;

applying the edge-guided colorization neural network to a training grayscale image corresponding to the ground truth color image, training color points, and the canny edges;

utilizing the edge-guided colorization neural network to generate predicted color; and modifying parameters of the edge-guided colorization neural network by comparing the predicted color with the ground truth color.

17. The system of claim 10, further comprising instructions that, when executed by the at least one server, cause the system to generate the colorized image by concatenating the color edge map into a plurality of layers of the edge-guided colorization neural network.

18. In a digital medium environment for editing and generating digital images, a computer-implemented method for generating enhanced-color digital images comprising:

generating a color edge map for a grayscale digital image using a color edge prediction neural network, wherein the color edge map comprises color edges;

providing, for display at a client device, a colorization graphical user interface comprising the color edge map, a color point input element, and the grayscale digital image;

generating a colorized image using an edge-guided colorization neural network based on the grayscale digital image, the color edge map, and user interaction with the color point input element; and providing the colorized image for display via the colorization graphical user interface.

19. The method of claim 18, further comprising:

providing, for display as part of the colorization graphical user interface, the color edge map together with color edge modification elements;

generating a modified edge map based on user interaction with the color edge modification elements; and generating a modified colorized image using the edge-guided colorization neural network based on the grayscale digital image, the modified edge map, and the user interaction with the color point input element.

20. The method of claim 19, further comprising generating the color edge map by:

generating an initial color edge map comprising initial edges utilizing the color edge prediction neural network;

utilizing the color edge prediction neural network to determine a confidence score for each of the initial edges; and based on determining that a confidence score associated with an initial edge of the initial edges meets a color edge threshold, including the initial edge in the color edge map as a color edge of the color edges.

\* \* \* \* \*